(12) United States Patent
Kozat et al.

(10) Patent No.: US 11,438,800 B2
(45) Date of Patent: Sep. 6, 2022

(54) APPARATUS, SYSTEM AND METHOD FOR TRAFFIC DATA MANAGEMENT IN WIRELESS COMMUNICATIONS

(71) Applicant: Huawei Technologies Co., Ltd., Shenzhen (CN)

(72) Inventors: Ulas Can Kozat, Santa Clara, CA (US); Georgios Paschos, Boulogne-Billancourt (FR); Kaippallimalil Mathew John, Carrollton, TX (US); Khosrow Tony Saboorian, Plano, TX (US); Yijun Yu, Shanghai (CN); Anthony C. K. Soong, Plano, TX (US); Zhixian Xiang, Frisco, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

(21) Appl. No.: 16/788,097

(22) Filed: Feb. 11, 2020

(65) Prior Publication Data
US 2020/0196194 A1 Jun. 18, 2020

Related U.S. Application Data

(63) Continuation of application No. PCT/US2018/055931, filed on Oct. 15, 2018.
(Continued)

(51) Int. Cl.
*H04W 28/10* (2009.01)
*H04W 28/06* (2009.01)

(52) U.S. Cl.
CPC .......... *H04W 28/10* (2013.01); *H04W 28/06* (2013.01)

(58) Field of Classification Search
None
See application file for complete search history.

(56) References Cited

U.S. PATENT DOCUMENTS

2010/0271981 A1* 10/2010 Zhao ............... H04N 21/632
370/256
2016/0156513 A1* 6/2016 Zhang ............... H04W 4/70
709/220
(Continued)

FOREIGN PATENT DOCUMENTS

CN 101897156 A 11/2010
CN 106792739 A 5/2017
(Continued)

OTHER PUBLICATIONS

"Wireless Technology Evolution Towards 5G: 3GPP Release 13 to Release 15 and Beyond", 5G Americas, Feb. 2017, 242 pages.

*Primary Examiner* — Gregory B Sefcheck
*Assistant Examiner* — Srinivasa R Reddivalam
(74) *Attorney, Agent, or Firm* — Slater Matsil, LLP

(57) ABSTRACT

Traffic data is divided into data streams corresponding to workloads, and the data streams are multiplexed onto slice segments based on a multiplexing requirement or rule. Each slice segment is a physical or virtual processing element in a wireless network supporting network slicing. In one example, the data streams are multiplexed onto the slice segments such that data streams having different utility definitions are assigned to different slice segments. In another example, the data streams are multiplexed onto the slice segments such that workloads in the same cluster partitioned in a T-dimensional vector space are assigned to different slice segments.

23 Claims, 10 Drawing Sheets

Related U.S. Application Data

(60) Provisional application No. 62/572,340, filed on Oct. 13, 2017.

(56) References Cited

U.S. PATENT DOCUMENTS

| | | | |
|---|---|---|---|
| 2017/0054595 A1* | 2/2017 | Zhang | H04L 41/12 |
| 2017/0064666 A1 | 3/2017 | Zhang | |
| 2017/0079059 A1* | 3/2017 | Li | H04W 16/02 |
| 2017/0164215 A1* | 6/2017 | Chen | H04W 16/10 |
| 2017/0257870 A1* | 9/2017 | Farmanbar | H04W 24/02 |

FOREIGN PATENT DOCUMENTS

| | | |
|---|---|---|
| CN | 106954267 A | 7/2017 |
| EP | 3229526 A1 | 10/2017 |

* cited by examiner

APPARATUS, SYSTEM AND METHOD FOR TRAFFIC DATA MANAGEMENT IN WIRELESS COMMUNICATIONS

CROSS-REFERENCE TO RELATED APPLICATIONS

This application is a continuation of PCT Application No. PCT/US2018/055931, filed Oct. 15, 2018, which claims priority to U.S. Provisional Application No. 62/572,340, filed Oct. 13, 2017, and entitled "System and Method for Agile Workload Management in 5G Systems", which applications are incorporated herein by reference in entirety.

TECHNICAL FIELD

The present disclosure relates generally to wireless communications, and in particular embodiments, to techniques and mechanisms for an apparatus, system and method for traffic data management in wireless communications.

BACKGROUND

Expectations on the upcoming 5G mobile networks go well beyond increased capacity and coverage for better broadband access to Internet or cloud services. Success of this generation may also be determined by its ability to assimilate vertical industries (e.g., m-health, vehicular, industry 4.0) and continuously evolve to accommodate waves of new applications that interconnect a vast number of physical (e.g., humans, machines, vehicles, cities, and environment) and virtual entities. One of key technologies to realize these expectations is network virtualization. People experience accelerating efforts in the wireless industry towards functional disaggregation and splitting, mobile network programmability, network function virtualization, and network slicing.

SUMMARY

Technical advantages are generally achieved, by embodiments of this disclosure which describe a system and method for traffic data management in wireless communications, such as agile workload management in 5G systems.

According to one aspect of the present disclosure, there is provided a method that includes receiving traffic data over different input ports of a multiplexer (or a multiplexing/demultiplexing unit) in a wireless network supporting network slicing; dividing, by the multiplexer, the traffic data into a plurality of data streams, each data stream corresponding to a workload, and being associated with an output port of the multiplexer; and multiplexing, by the multiplexer, the data streams onto a plurality of slice segments, each slice segment being a physical or virtual processing element in the wireless network, wherein multiplexing the data streams comprising: partitioning workloads corresponding to the plurality of data streams in a T-dimensional vector space into a plurality of clusters, workloads in a same cluster being correlated with one another, the T-dimensional vector space being formed based on processing times required by historical workloads at the multiplexer in a preceding consecutive batch of T time intervals; and assigning the data streams to the plurality of slice segments such that workloads in a same cluster are assigned to different slice segments.

According to another aspect of the present disclosure, there is provided an apparatus that includes a non-transitory memory storage comprising instructions; and one or more processors in communication with the memory storage, wherein the one or more processors execute the instructions to perform the method above.

According to another aspect of the present disclosure, there is provided a method that includes receiving traffic data over different input ports of a multiplexer (or a multiplexing/demultiplexing unit) in a wireless network supporting network slicing; dividing, by the multiplexer, the traffic data into a plurality of data streams, each data stream corresponding to a workload, and being associated with an output port of the multiplexer; and multiplexing, by the multiplexer, the data streams onto a plurality of slice segments, each slice segment being a physical or virtual processing element in the wireless network, wherein multiplexing the data streams comprising multiplexing the data streams onto the plurality of slice segments based on utility definitions of the data streams such that data streams having different utility definitions are assigned to different slice segments.

According to another aspect of the present disclosure, there is provided a method that includes receiving traffic data over different input ports of a multiplexer (or a multiplexing/demultiplexing unit) in a wireless network supporting network slicing; dividing, by the multiplexer, the traffic data into a plurality of data streams, each data stream corresponding to a workload, and being associated with an output port of the multiplexer; and multiplexing, by the multiplexer, the data streams onto a plurality of slice segments, each slice segment being a physical or virtual processing element in the wireless network.

Optionally, in any of the preceding aspects, partitioning the workloads corresponding to the plurality of data streams in the T-dimensional vector space comprises partitioning the workloads corresponding to the plurality of data streams using a k-means clustering technique.

Optionally, in any of the preceding aspects, a slice segment in the plurality of slice segments comprises a cascade of one or more virtual or physical processors.

Optionally, in any of the preceding aspects, a slice segment in the plurality of slice segments comprises a baseband processing unit.

Optionally, in any of the preceding aspects, a slice segment in the plurality of slice segments comprises a chain of one or more user plane functions in a 5G network.

Optionally, in any of the preceding aspects, the multiplexer comprises a software defined networking (SDN) switch.

Optionally, in any of the preceding aspects, the multiplexer is located in a radio access network (RAN) cloud.

Optionally, in any of the preceding aspects, the traffic data is received by the multiplexer from another set of slice segments.

Optionally, in any of the preceding aspects, each of the plurality of data stream is generated by a different remote radio head (RRH) in the wireless network, and wherein each output port of the multiplexer is associated with a different baseband processing unit (BBU).

Optionally, in any of the preceding aspects, each of the plurality of data stream includes a traffic flow transmitted by different user equipment (UEs) over uplink channels of the wireless network.

Optionally, in any of the preceding aspects, each of the plurality of data stream includes a packet flow generated by different baseband processing units (BBUs) in the wireless network.

Optionally, in any of the preceding aspects, multiplexing the data streams includes partitioning workloads corresponding to the plurality of data streams in a T-dimensional vector space into a plurality of clusters, workloads in a same cluster being correlated with one another, the T-dimensional vector space being formed based on processing times required by historical workloads at the multiplexer in a preceding consecutive batch of T time intervals; and assigning the data streams to the plurality of slice segments such that workloads in a same cluster are assigned to different slice segments.

Optionally, in any of the preceding aspects, multiplexing the data streams includes multiplexing the data streams onto the plurality of slice segments based on utility definitions of the data streams such that data streams having different utility definitions are assigned to different slice segments.

According to another aspect of the present disclosure, there is provided an apparatus in a 5G network that includes a first multiplexing/demultiplexing (mux/demux) unit and a second mux/demux unit, each of the first mux/demux unit and the second mux/demux unit being configured to receive traffic data over different input ports, and divide the traffic data into a plurality of data streams, each data stream corresponding to a workload, and being associated with an output port of the respective mux/demux units; and a plurality of slice segments coupled between the first mux/demux unit and the second mux/demux unit, each slice segment being a physical or virtual processing element in the 5G network, and the plurality of slice segments being configured to process workloads corresponding to the data streams and send processed workloads to the second mux/demux unit. The first mux/demux unit is configured to multiplex the data streams onto the plurality of slice segments according to a pre-determined multiplexing requirement.

According to another aspect of the present disclosure, there is provided an apparatus that includes a first multiplexing/demultiplexing (mux/demux) unit and a second mux/demux unit, each of the first mux/demux unit and the second mux/demux unit being configured to receive traffic data over different input ports, and divide the traffic data into a plurality of data streams, each data stream corresponding to a workload, and being associated with an output port of the respective mux/demux units; and a plurality of slice segments coupled between the first mux/demux unit and the second mux/demux unit, each slice segment being a physical or virtual processing element in the 5G network, and the plurality of slice segments being configured to process workloads corresponding to the data streams and send processed workloads to the second mux/demux unit. The first mux/demux unit is configured to multiplex the data streams onto the plurality of slice segments based on utility definitions of the data streams, such that data streams having different utility definitions are assigned to different slice segments.

According to another aspect of the present disclosure, there is provided an apparatus that includes a first multiplexing/demultiplexing (mux/demux) unit and a second mux/demux unit, each of the first mux/demux unit and the second mux/demux unit being configured to receive traffic data over different input ports, and divide the traffic data into a plurality of data streams, each data stream corresponding to a workload, and being associated with a different output port of the respective mux/demux units; and a plurality of slice segments coupled between the first mux/demux unit and the second mux/demux unit, each slice segment being a physical or virtual processing element in a wireless network, and the plurality of slice segments being configured to process workloads corresponding to the data streams and send processed workloads to the second mux/demux unit.

The first mux/demux unit is configured to multiplex the data streams onto the plurality of slice segments by: partitioning workloads corresponding to the plurality of data streams in a T-dimensional vector space into a plurality of clusters during a first time interval, workloads in a same cluster being correlated with one another, the T-dimensional vector space being formed based on processing times that are required by historical workloads received at the first mux/demux unit in a preceding consecutive batch of T time intervals; and assigning the data streams to the plurality of slice segments such that workloads in a same cluster are assigned to different slice segments.

Optionally, in any of the preceding aspects, the multiplexing requirement requires load balancing among the plurality of slice segments, and wherein the first mux/demux unit multiplexes the data streams onto the plurality of slice segments by: partitioning workloads corresponding to the plurality of data streams in a T-dimensional vector space into a plurality of clusters during a first time interval, workloads in a same cluster being correlated with one another, the T-dimensional vector space being formed based on processing times that are required by historical workloads received at the first mux/demux unit in a preceding consecutive batch of T time intervals; and assigning the data streams to the plurality of slice segments such that workloads in a same cluster are assigned to different slice segments.

Optionally, in any of the preceding aspects, partitioning the workloads corresponding to the plurality of data streams in the T-dimensional vector space comprises partitioning the workloads corresponding to the plurality of data streams using a k-means clustering technique.

Optionally, in any of the preceding aspects, the multiplexing requirement requires that the data streams are assigned to the plurality of slice segments based on utility definitions of the data streams, and wherein data streams having different utility definitions are assigned to different slice segments.

Optionally, in any of the preceding aspects, a slice segment in the plurality of slice segments comprises a cascade of one or more virtual or physical processors.

Optionally, in any of the preceding aspects, a slice segment in the plurality of slice segments comprises a baseband processing unit.

Optionally, in any of the preceding aspects, a slice segment in the plurality of slice segments comprises a chain of one or more user plane functions in the 5G network.

Optionally, in any of the preceding aspects, the first mux/demux unit or the second mux/demux unit comprises a software defined networking (SDN) switch.

Optionally, in any of the preceding aspects, the first mux/demux unit or the second mux/demux unit is located in a radio access network (RAN) cloud.

Optionally, in any of the preceding aspects, traffic data received by the first mux/demux unit is from another set of slice segments.

Optionally, in any of the preceding aspects, each of the plurality of data stream at the first mux/demux unit is generated by a different remote radio head (RRH) in the 5G network, and wherein each output port of the first mux/demux unit is associated with a different baseband processing unit (BBU).

Optionally, in any of the preceding aspects, each of the plurality of data stream includes a traffic flow transmitted by different user equipment (UEs) over uplink channels of the 5G network.

Optionally, in any of the preceding aspects, each of the plurality of data stream includes a packet flow generated by different baseband processing units (BBUs) in the 5G network.

According to another aspect of the present disclosure, there is provided a method of operating a multiplexer. The method includes receiving traffic data over at least two input ports of a multiplexer in a wireless network supporting network slicing; dividing the traffic data into a plurality of data streams that correspond to a plurality of workloads; and multiplexing the data streams onto a plurality of slice segments, wherein each slice segment comprises at least one processing element in the wireless network.

Optionally, in any of the preceding aspects, the processing element is a virtual processing element.

Optionally, in any of the preceding aspects, the processing element is a physical processing element.

Optionally, in any of the preceding aspects, the step of multiplexing further comprises correlating workloads that are in the same cluster; partitioning the plurality of workloads corresponding to the plurality of data streams in a vector space into a plurality of clusters; correlating workloads based upon the presence of at least two workloads in one of the plurality of clusters; and assigning the data streams to the plurality of slice segments such that workloads in a same cluster are assigned to different slice segments.

Optionally, in any of the preceding aspects, the vector space is formed based on processing times required by historical workloads at the multiplexer in a preceding consecutive batch of time intervals.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
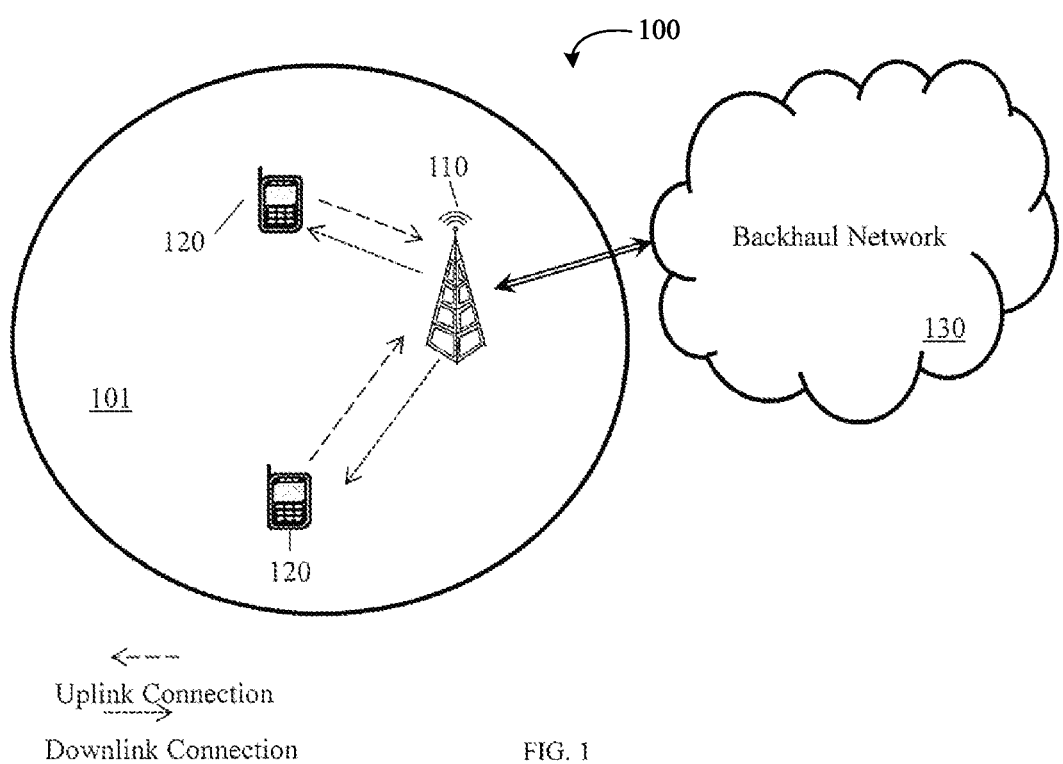
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

5G systems may provide an agile, cloud-based service infrastructure utilizing a combination of architectural concepts such as network function virtualization, micro-services, software defined networking, and network slicing. In 5G clouds, network functions, applications and services (e.g., traffic transportation, etc.) may be represented as dynamic workloads that can be executed dynamically, or in an on-demand fashion, whenever and wherever the network functions, applications, and/or services are demanded by a device or user in a shared physical infrastructure. With such flexibility, system complexity also increases requiring new ways of resource provisioning for high performance and reliability.

Aspects of the present disclosure provide that underlying physical infrastructure is divided into multiple parallel slice segments. Each of the multiple parallel slice segments may utilize a relatively small portion of a homogeneous set of physical resources in a particular resource domain. End to end slices are realized by concatenating these slice segments together to realize a particular network service with a predefined set of functions and service level agreements (SLAs). Network traffic is adaptively distributed onto these parallel slice segments based on workload modeling and classification in each resource domain, such that a statistical multiplexing gain is maximized over a set of physical or virtual processors in that resource domain while extracting the highest utility for network flows.

In some embodiments, a multiplexing/demultiplexing unit divides received traffic data into data streams corresponding to workloads, and multiplexes the data streams onto slice segments based on a multiplexing requirement or rule. Each slice segment may be referred to as a physical or virtual processing element in a wireless network supporting network slicing. In one example, the data streams are multiplexed onto the slice segments such that data streams having different utility definitions are assigned to different slice segments. In another example, the data streams are multiplexed onto the slice segments such that workloads in a same cluster partitioned in a T-dimensional vector space are assigned to different slice segments. Workloads in the same cluster are correlated with one another, and the T-dimensional vector space is formed based on processing times required by historical workloads at the multiplexing/demultiplexing unit in a preceding consecutive batch of T time intervals.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a gNodeB, a transmit-receive point (TRP), a macro-cell, a femtocell, a Wi-Fi access point (AP), or other wirelessly enabled devices. Base stations may provide wireless access in accordance with one or more wireless communication protocols, e.g., next generation radio (NR), long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

While 5G networks may allow much more flexible and agile access to resources, complexity of resource allocation and service provisioning decisions increases accordingly. Network management and orchestration (MANO) may be posed to play an unprecedented role in taming this complexity in massively distributed 5G clouds via extensive automation supported by data collection, abstraction, modeling, learning, and network programming in an adaptive feedback loop. Platform solutions that can pack more and diverse set of network services over the same physical infrastructure while providing flexibility to dynamically adapt to the changes in customer demand in different times and locations may have an advantage against alternatives that are based on resource overprovisioning. Over time, mobile edge cloud may eventually resemble a hyperscale data center with disaggregated resources interconnected over a shared cross-haul network. It may be possible to realize new services that live entirely at the radio access side. In essence, 5G cloud may be a ubiquitous convergence point for utility based computing and utility based networking. A 5G network infrastructure may include a hierarchy of aggregation points, which may be cloudified to host network functions and emerging services.

Figure 2:
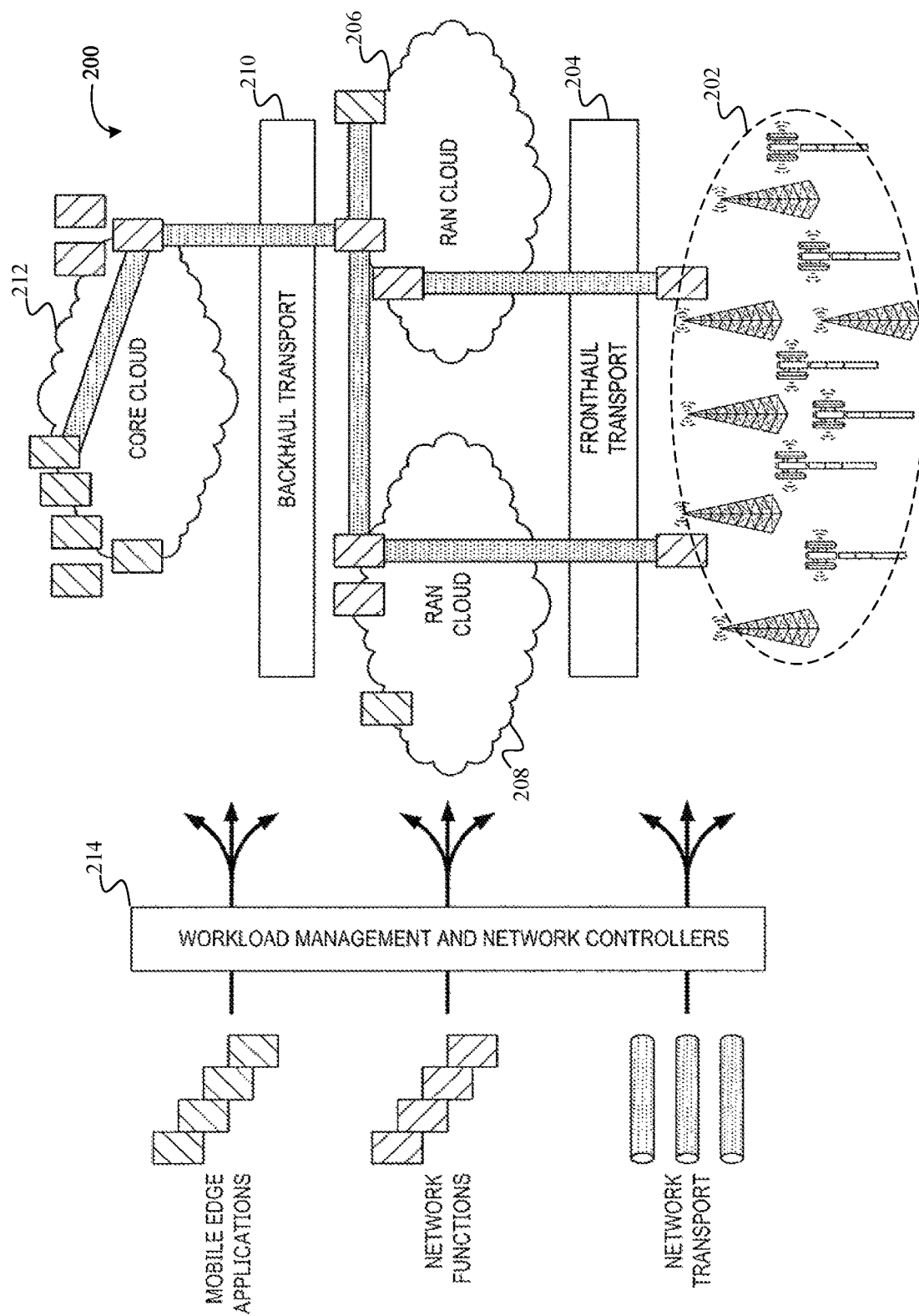
FIG. 2 illustrates a diagram of an embodiment 5G network.

FIG. 2 illustrates a diagram of a network 2000 according to an embodiment of the present disclosure. As shown, the network 200 includes a plurality of radio frontend nodes (RFNs) 202, radio access network (RAN) clouds 206, 208, a core cloud 212, and one or more workload management and network controllers 214. The RFNs 202, RAN clouds 206, 208, and the core cloud 212 communicate with one another using network transports, such as a backhaul transport 210 or a fronthaul transport 204. Each of the RAN clouds 206 and 208 and the core cloud 212 supports one or more mobile edge applications and network functions.

The RFNs 202 are infrastructure points that are closest to mobile devices. Optionally, two types of RFNs 202 may be defined. A first type is a remote radio head (RRH) that may exchange in-phase (I)/quadrature-phase (Q) samples with a baseband processor in the RAN cloud 206 or 208 through the fronthaul transport 204. A second type is a programmable remote node that may host baseband processing by itself, as well as other radio access network functions that benefit from baseband colocation as needed. The evolved common public radio interface (eCPRI) specification supports a number of splitting options within the physical layer and at higher layers, and allows for various types of the fronthaul transport 204 being utilized, including optical, Ethernet, IP, or wireless transport. With the support of software-defined network (SDN) and network functions virtualization (NFV), the changes in wireless link quality, backhaul capacity, or workload conditions may be monitored by the workload management and network controllers 214 and may be used as input for deciding the functional splitting in real-time.

The RAN cloud 206 or 208 is a cloud location that is relatively most proximal to the mobile devices and has the ability to host functions and applications necessary to satisfy ultra-low latency, high reliability, and ultra-high bandwidth services. In one embodiment, in order to provide a 1 ms end-to-end latency between two mobile devices, an upper bound on the distance between a RFN 202 and a RAN cloud 206 or 208 may be less than 100 kilometers when optical links are used in the fronthaul transport 204. If a RAN cloud 206 or 208 is hosting wireless schedulers, the distance may further be limited by channel coherence times, beyond which channel state information would be outdated. For vehicular speeds (e.g., 100 Kmph), a channel coherence time may be in the order of milliseconds at relatively low frequencies (e.g., less than 2 GHz), whereas at millimeter wave frequencies, the channel coherence time may be in the order of loos of microseconds. Thus, to support a media access control (MAC) layer in cloud RAN (C-RAN) at millimeter wave frequencies, a RAN cloud 206 or 208 may not be more than 20 km apart from RFNs. When baseband processing is done at the RAN cloud 206 or 208, the maximum length of the fronthaul transport 204 is estimated to be in the order of 15-20 km with the CPRI.

The core cloud 212 may correspond to relatively few cloud locations each covering a large portion of a national network serving traffic to/from other network and cloud providers via distributed gateway functions. The core cloud 212 may be configured to host legacy 3rd Generation Partnership Project (3GPP) and non-3GPP core network functions, facilitate high bandwidth national and global coverage, support roaming services, and centrally manage the overall inventory and network operations, etc. The core cloud 212 may be mostly virtualized albeit with hardware accelerators and services may be hosted in the form of virtual machines or software containers.

The intra as well as inter RAN clouds 206 and 208 and Core clouds 212 communication is done via a backhaul transport 210 that may be a completely orthogonal solution with respect to the fronthaul transport 204. In one embodiment, depending on the layer splitting adopted between the RFNs 202 and RAN clouds 206 and 208, a unified x-haul solution may potentially replace the fronthaul transport 204 and backhaul transport 210. In another embodiment separate network slices may be provided for the fronthaul transport 204 and backhaul transport 210 over the same physical substrate. This may be used for networks that already provide ultra-reliable low latency communications (URLLC). The workload management and network controllers 214 may be configured to monitor and manage operations of the network 200, and manage workload distribution and processing in the network 200. In some example, the network 200 may be a 5G, or a next generation radio (NR) network.

End to end (e2e) services may cross different layers and employ multiple network functions at each layer. In some embodiments, utility-based network slicing may be employed for providing e2e services. Network slicing may allow multiple virtual networks to be created on top of a common shared physical infrastructure, and the virtual networks may then be customized to meet specific needs of applications, services, devices, customers or operators. Network slicing may facilitate the satisfaction of diverse SLAs of e2e services by means of provisioning the appropriate functionality and resource scheduling at each layer and network domain. For example, in the case of the 5G network, a single physical network may be sliced into multiple virtual networks that may support different RANs, or different service types running across a single RAN.

In some embodiments, distinct SLA requirements of e2e services correspond to distinct slice types. A slice type may correspond to a set of network functions and a service SLA. When an e2e service is carried over a specific network slice type, it may utilize a set of control plane (CP) and user plane (UP) functions specifically designed for that slice type. CP functions may essentially support control signaling. CP functions interact with each other forming cyclic signaling flows. UP functions process user traffic in a loop-free manner forming a service chain between ingress and egress points. In some embodiments, network slicing may be performed such that each CP function in a given slice is transformed into a micro-service. In this case, an application program interface (API) call may not be targeted towards a specific CP function but to a micro-service. All instances of a specific CP function in a given slice may be seen by other functions as one logical entity. With a decoupling between state and computation, API calls to a micro-service may be indirect, and performed by a network to any CP function constituting that micro-service. API routing, scaling and upgrading CP functions, metering and charging API calls, etc., may be handled transparently to an API consumer and on a per slice basis.

For user plane processing, each network slice type, in some embodiments, may have many slice instances each consuming a relatively smaller portion of physical resources and spanning one or more cloud locations based on ingress and egress points of a service (i.e., based on where applications and users are located). Scaling a slice type amounts to adding more slice instances into a system or removing some of the existing slice instances. Contrasting to adding more resources to each slice instance, increasing the number of slice instances has an advantage of increasing system diversity against hot spots occurring in a system due to spontaneous congestion or failures, and providing utility based networking.

In some embodiments, e2e SLAs may be mapped onto optimization problems with specific utility functions and lists of constraints from mathematical perspectives. In this case, each slice instance may correspond to a particular utility maximization problem, where all flows in that slice may be assumed to share the same utility definition and subject to the same constraints. The resulting system may correspond to a particular utility maximization problem. An example of such mapping may be seen in a method of congestion control of various TCP protocols for protecting networks from congestion, where it was shown that the method may correspond to solving different alpha-fair utility maximization problems. It is noted that some systems may not be designed with such a top down view, but with a more bottom up approach, where layers and functionalities are defined based on experience of network architects and based on expected flow characteristics.

The role of slicing in utility based networking is quite profound. In particular, slices may be used, in some embodiments, to separate network domains and allow for usage of a different utility based networking method within each domain. In an example of utility based networking, types of flows may be considered in a network. A first type may set a sending rate based on end to end delay signaling or measurement. Examples of this type of flows may include traffic flows according to the data center transmission control protocol (DCTCP), or transmission control protocol (TCP) Vegas, etc. A second type may set a sending rate mainly based purely on packet losses. This may be the case in TCP Reno, or TCP Cubic, etc. In this example, these two rate control mechanisms of the two types may not have the same objective in terms of latency. The first type may try to eliminate/mitigate queuing delays while getting its fair share of path bandwidth, and the second type may be solely interested in maximizing its fair share of throughput. In one example, splitting these two types of flows onto their own respective slice instances may provide isolation from each other (i.e., one slice instance with low queue build-up and one slice instance with large queue build-up), while allowing flows in each slice instance to play a fair game dictated by the utility definition in their corresponding slices.

In some embodiments, end to end slices may be modeled and realized with multiple slice segments each covering a different resource domain. A resource domain may refer to a set of resources located (e.g., physically, logically or virtually) at a specific location, and administrated by an associated administrator (e.g., physically, logically or virtually). Examples of a resource domain may include a RAN domain, or a core network (CN) domain. Slice segments covering a RAN domain may be referred to as RAN segments, and slice segments covering a CN domain may be referred to as CN segments. Different functional splitting and disaggregation options considered in a slice type may lead to a different number of segments. A slice segment herein refers to one or more virtual or physical processing elements or functions for processing or servicing traffic. For example, a slice segment may be a cascade of one or more virtual or physical processors, a baseband processing unit (BBU) instance, or a chain of one or more UP functions in 5G networks. Depending on actual functional split, types of slice segments may be differentiated.

Embodiments of the present disclosure provide a workload-centric architecture of a network, such as 5G cloud, that may be used for efficient resource provisioning. The workload-centric architecture may be characterized by dynamic workload, elastic parallel workloads, decoupled computation and state, or model-driven workload distribution. In some embodiments, workloads may be modeled as dynamic workloads. In 5G cloud, mobile edge applications, network functions, network transport, network slices, and network traffic create a complicated ecosystem of resource requirements. All these requirements may be modeled as dynamic workloads that require scalable resource assignment based on actual demands. Workloads may be executed anywhere as long as application requirements are satisfied within physical constraints. A particular workload may be paused, pre-empted, migrated, replicated, split, or terminated as a function of all workloads in a system and the system capacity. Some workloads may be location specific (e.g., workloads of applications related to tourist hot spots, train stations, stadiums, etc.), some may be user centric (e.g., workloads generated by enterprise customers, roaming customers, etc.), while some may be ubiquitous (e.g., workloads related to mobile broadband access). Efficient pooling of distributed cloud resources requires classification and modeling of each workload type in terms of how they consume compute, memory and link resources, when and where they are demanded, and how different workloads are correlated.

In some embodiments, workloads of a network service may be divided into elastic parallel workloads. It may take a great time to solve an optimization problem, and an obtained solution may only be an approximation of the optimal one. On the other hand, when taking an elastic view of resources (e.g., fractional resource scaling per slice, and split of allocations over multiple resource nodes/links), a hefty tool of continuous optimization may be used. From the perspective of network traffic, grouping network flows at different granularities may be enabled by various protocols including multiprotocol label switching (MPLS), bearers, virtual local area network (VLAN), virtual extensible LAN (VXLAN), network service header (NSH), etc. On top of these protocols, software defined networking (SDN) allows fine-tuning and agile management of traffic resources. From the perspective of network functionality, workload elasticity may be made possible with the adoption of cloud native design principles, where network functions are packed in software containers that consume a fraction of physical resources available on host machines and avoid the virtualization tax, i.e., overhead associated with virtualization. In one embodiment, instead of providing a network service with a cascade of large network functions, elastic workload allocation may be employed to divide the network service onto many parallel network slice instances and to distribute functions of each slice instance as independent units based on network conditions and service requirements. In this way, elastic workloads may utilize any idle capacity in a system effectively.

In some embodiments, computation and state may be decoupled. When considering generally everything as elastic workload, the ultimate efficiency may be reached by shifting functional computation freely around the 5G cloud. Copies of internal functional states are immediately available at every available cloud location, workloads may also be shifted freely with minimal or no service interruption by simply spawning new functions where they were desired and terminating functions where they were not needed, or by changing load-balancing rules. Thus, it can avoid a complex and expensive task that is made from workload migration caused by many network functions having intrinsic state at the session level, e.g., packet sequence numbers, dictionaries formed during compression, transmission/retransmission status, or user information, etc. A path towards this state decoupling may be via utilizing a highly elastic and distributed database system across 5G cloud locations. Such a database may serve as the ether between network functions for the distribution of critical states with the capability of cache synchronization during workload shifts.

In some embodiments, workload distribution may be driven by modeling. 5G cloud may serve demanding applications that require relatively lower delay, higher throughput, and/or more reliable communication than its predecessors. For example, ultra-reliable low latency communications (URLLC) may be considered a major 5G requirement. Workload modeling has become a very critical component in satisfying service level agreements (SLAs) with high system utilization. Statistical multiplexing, i.e., sharing the processor across many jobs rather than dedicating it to a single job, is one of the core principles for network efficiency. Jobs in the context of 5G cloud may be packets or computational tasks (e.g., a virtual network function or an application) waiting to be processed. To compensate for bursty arrivals and prevent job losses, however, buffering may have to be done, leading to additional latency. Undesired queueing may be prevented and low system delays may still be maintained for high priority jobs by supporting different service classes, prioritization, and proper admission control and pre-emption mechanisms. Furthermore, cloud systems may include many parallel processors, and performance of statistical multiplexing may be improved by placing jobs with the best statistical multiplexing characteristics onto the same processor. Consequently, burstiness may be mitigated in a cloud system. In this case, it would be possible to deliver low delay and low jitter processing without impairing the system's throughput and reliability. As workload characteristics may change over a short-time period, especially in a RAN cloud (e.g., due to mobility, wireless scheduling, and wireless channel conditions), real-time workload modeling and regrouping workloads for generally maximal statistical multiplexing gains may bring an additional boost in system performance and efficiency.

Figure 3:
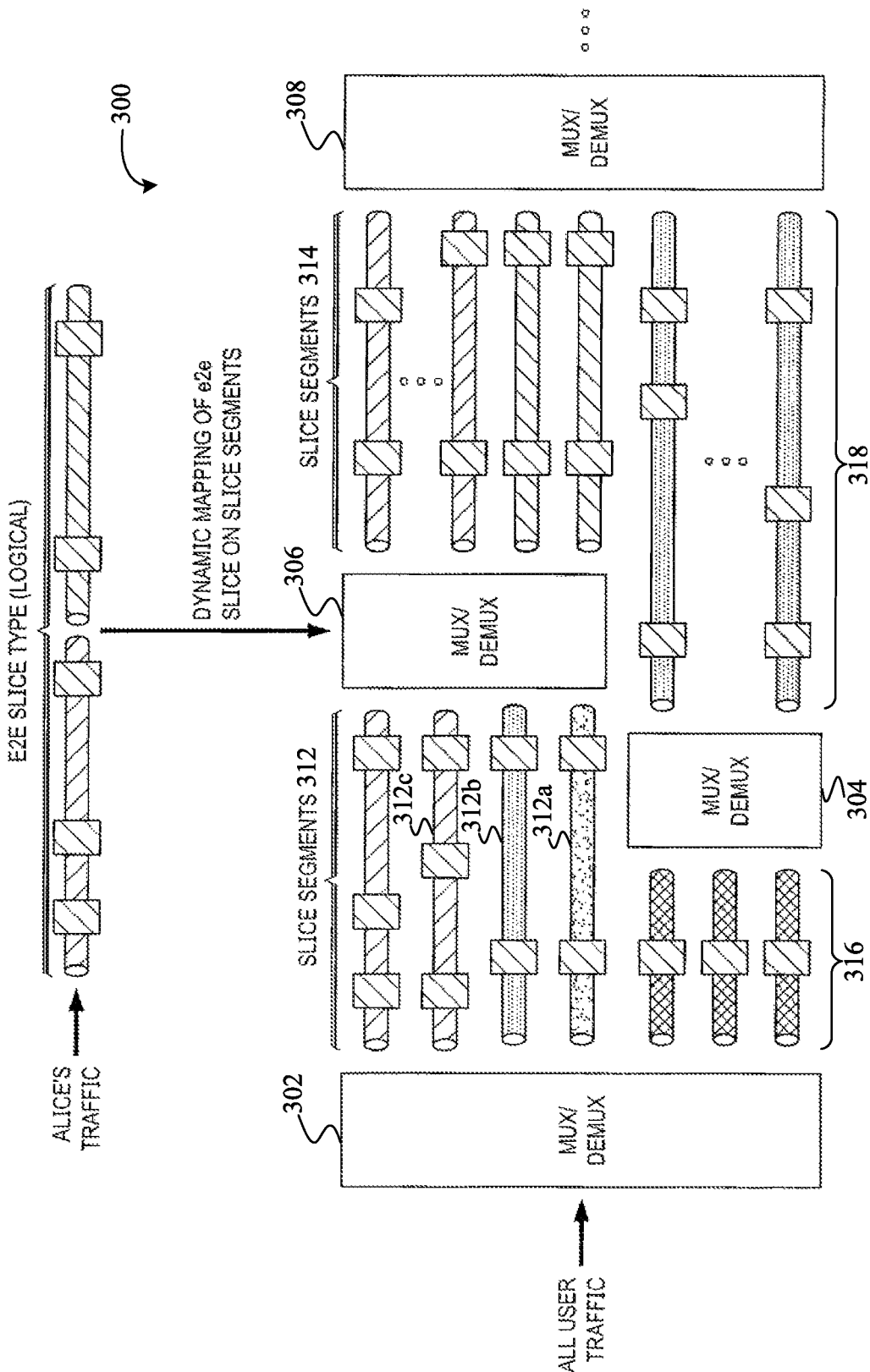
FIG. 3 illustrates a diagram of embodiment e2e network slices.

FIG. 3 illustrates a diagram of an embodiment of e2e network slices 300 implemented with multiple slice segments. In this example, slice segments start with and terminate at multiplexing/demultiplexing (mux/demux) units. FIG. 3 illustrates mux/demux units 302, 304, 306 and 308. A mux/demux unit 302, 304, 306 or 308 may be a physical hardware, or a virtual device that is configured to de-multiplex (or divide) received traffic data into data streams and multiplex these data streams onto a plurality of slice segments. For example, a mux/demux unit 302, 304, 306 or 308 may be a switch, or a router. A mux/demux unit 302, 304, 306 or 308 may include one or more physical or virtual input ports for receiving traffic data. The mux/demux unit 302, 304, 306 or 308 may also include one or more physical or virtual output ports. Data streams generated by the mux/demux unit 302 from traffic data may be associated with different output ports. For example, each data stream may be associated with (or assigned to) an output port. In another example, multiple data streams may be assigned to one output port. The input ports and the output ports may be associated with different slice segments. Association between the input/output ports and the slice segments may be fixed, e.g., for a period of time, or dynamically changeable. MANO may add/remove slice segments, and the association may then be updated. Slice segments 312 start at mux/demux unit 302 and terminal at mux/demux unit 306. Slice segments 314 start at mux/demux unit 306 and terminal at mux/demux unit 308. Slice segments 316 start at mux/demux unit 302 and terminal at mux/demux unit 304. Slice segments 318 start at mux/demux unit 304 and terminal at mux/demux unit 308. Slice segments that have the exact same set of functions and matched processing capabilities as well as the same ingress and egress cloud locations are shown with the same shading. For example, the slice segments 316 all have the same set of functions and matched processing capabilities, and they all start at mux/demux unit 302 and terminal at mux/demux unit 304. Slice segments 312a, 312b and 312c, although all starting and terminate at the same mux/demux units (i.e., mux/demux units 302 and 306), are different than each other for having different functions.

A mux/demux unit may be configured to receive user traffic (e.g., mux/demux unit 302) and divide the user traffic into multiple data streams. Each data stream corresponds to a different workload. The mux/demux unit may also be configured to receive incoming traffic from multiple slice segments, e.g., mux/demux units 306, 304 and 308, and divide the traffic into multiple data streams. The mux/demux unit may then map the multiple data streams onto one of the slice segments. The mapping may change dynamically by network controllers, e.g., when slice segments are added/removed, network state changes, or workload characteristics evolve. A mux/demux unit may be programmable. In one embodiment, when particular user traffic (e.g., an Alice's flow as shown FIG. 3) is serviced, it may first be classified to a particular slice type with well-defined slice segments. A mux/demux unit may switch the user traffic to one of a plurality of slice segments following the mux/demux unit based on this classification. Which particular segment may be selected by the mux/demux unit may be based on further workload modeling and analytics. A slice segment may be shared across different slice types.

In some embodiments, SDN switches may be deployed to serve as mux/demux units. In this case, each slice segment may be understood as to correspond to a link and each mux/demux unit correspond to a node on a network graph. Within this model, selecting a slice segment for mapping a data stream may be solved as a routing problem. In this case, each network flow may only be served by a sub-graph induced by the slice type of the network flow. The routing graph may be scaled up and down by a MANO as the MANO adds or removes slice segments based on customer demands.

Figure 4:
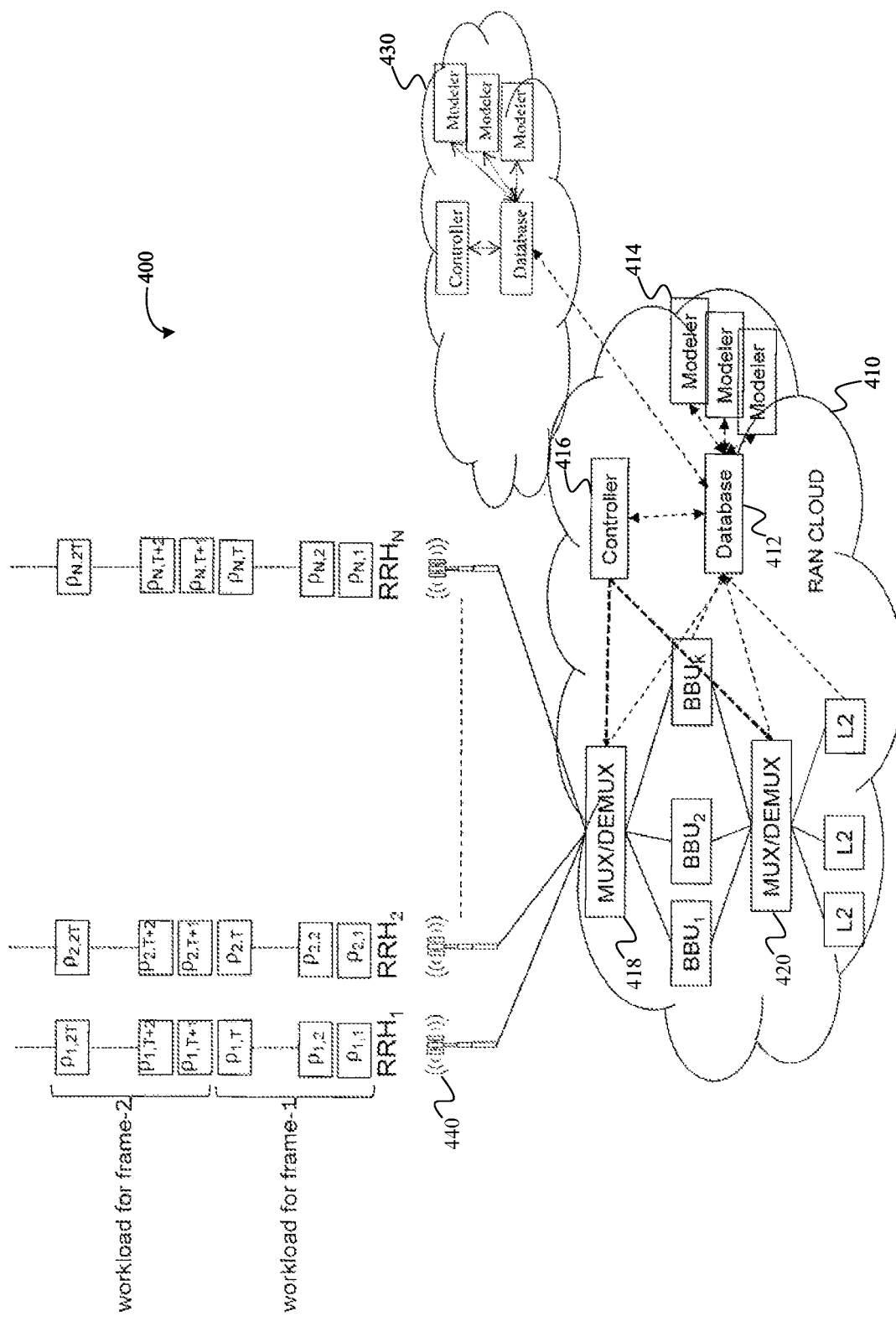
FIG. 4 illustrates a diagram of another embodiment 5G network.

FIG. 4 illustrates a diagram of a network 400 of an embodiment in the present disclosure. FIG. 4 illustrates an example of how uplink workloads are processed at a RAN cloud. Uplink processing (i.e., receiver side) may, in some case, be more demanding than downlink processing (i.e., transmitter side) in RAN clouds. Uplink workloads are used herein merely as an example. The embodiment may also be applied to downlink workloads, or workloads communicated between network nodes. The network 400 supports network slicing and network slices are implemented by slice segments. The network 400 includes RAN clouds 410, 430, and N RRH units 440 (i.e., $RRH_1$, $RRH_2$, ... $RRH_N$) configured to communicate with RAN clouds 410, 4300. The RAN clouds 410, 430 may be configured to communicate with each other. The architecture of the network 400 shown in FIG. 4 is known as cloud-RAN (C-RAN), and may allow workload aggregation for baseband processing and enable coordinated multipoint radio transmissions at RAN clouds. In some example, a small degree of aggregation (e.g., 6 cells) may be sufficient to provide significant improvement in baseband processing (e.g., 30%). Alternatively, hundreds of cells may coexist in an area of around 15 km radius, which creates ample opportunity for dynamic workload distribution. It would be appreciated that processing gains may further be improved.

In this example, for communications between the RAN cloud 410 and the RRH units 440, functions may be split such that baseband processing is performed at the RAN cloud 410, and the RRH units 440 deliver I & Q samples to the RAN cloud 4100. The RAN cloud 410 may include physical and virtual functions that may be flexibly reconfigured and chained together dynamically as a function of time-varying workloads. The RAN cloud 410, as shown, includes a mux/demux unit 418 that receives workloads from the RRH units 440, and maps the workloads to k baseband processing unit (BBU), i.e., $BBU_1$, $BBU_2$, ... $BBU_k$. The output of each of the k BBUs is fed into a mux/demux unit 420, which distributes its output to L2 functions for further processing. In this example, the k BBUs are slice segments for processing workloads from the mux/demux unit 418. The k BBUs are coupled between the mux/demux unit 418 and the mux/demux unit 420. The RAN cloud 410 also includes a common database layer or common database 412 across functions and applications to store functional states, application states, measurements and modeling results. The RAN cloud 410 may include one or more modelers 414 that may model various aspects of applications, network functions, platform components, and workloads through data analytics, machine learning, stochastic analysis, etc. The RAN cloud 410 may further include one or more controllers 416 that make decisions on how workloads are processed in the RAN cloud 410 based on inputs from the database 412 and the modelers 414. Similarly, the RAN cloud 430 includes a controller, a database, and one or more modelers.

In some embodiments, workloads generated by each RRH unit 440 may be divided into logical frames in line with the scheduling frames in 3GPP networks. For example, one frame includes to subframes and each subframe has a duration of one transmission time interval (TTI) or a slot. FIG. 4 shows that each frame (e.g., frame-1, or frame-2) has T subframes. Each subframe may correspond to a workload. In this embodiment, a number of computational cycles required for processing a workload that is generated by the i-th RRH unit during the k-th subframe is denoted as $\rho_{i,k}$. FIG. 4 shows each workload using the number of computational cycles required for processing the corresponding workload. Throughout the disclosure, a workload is represented by the processing time (or a number of computational cycles) that is needed for processing the workload. Each RRH unit generates a workload in a subframe. A computational cycle may be referred to as a period of time that is used for processing a workload. The period of time may be represented using processing cycles, e.g., of a processor. Workloads coming from the N RRHs via fronthaul links/transports are multiplexed by the mux/demux unit 418 onto the K BBUs, where N>>K. When any subframe from any RRH unit 430 has been processed by one or more of the BBUs, whereby generating decoded byte streams, the byte streams are passed onto the mux/demux unit 420 at the output stage of the BBUs, and each subframe is then switched from a particular RRH onto a particular layer 2 (L2) function for further processing and packet formation in a next slice segment.

When multiplexing the workloads onto the K BBUs, the mux/demux unit 418 may need to determine which workload is assigned to which BBU according to a pre-determined multiplexing rule or requirement. Which BBU receives which RRH workloads, or the multiplexing rule or requirement, may be programmed by a local controller, e.g., the controller 416. In some embodiments, workloads may be assigned to the BBUs or other slice segments based on utility definitions of the workloads. As discussed above, different types of traffic may have different utilities, and assigning workloads of different utilities to the same BBU may result in poor performance of one type of workloads. In one embodiment, workloads having different utility definitions may be assigned to different slice segments, such that utility requirements of the workloads are accommodated. In some embodiments, the RRH workloads may be distributed to the BBUs on a frame by frame basis. In this case, the multiplexing function may be understood to remain the same during a frame, and may change in subsequent frames. For instance, during frame-1, $RRH_1$ and $RRH_2$'s workloads may be placed together on $BBU_1$, whereas during frame-2, $RRH_1$ and $RRH_N$'s workloads may be placed together on $BBU_2$. Accordingly, the total workload at a given BBU will not exceed an allowable threshold, and severe delays and losses during packet processing disturbing the communications caused by superposition of workloads in each subframe at the given BBU may be avoided. In some embodiments, the controller 416 may select/determine multiplexing functions at the mux/demux unit 418 such that maximum workload observed by any BBU in each subframe may be generally minimized. As a result, loads among the BBUs may be balanced. It would be recognized by those skilled in the art that any BBUs may be applicable in the embodiments of the present disclosure. For example, BBUs with smaller or larger (scale of) processing units, or having different boards or chips maybe applied in the embodiment methods.

In some embodiments, the $\rho_{i,k}$ values may not be known until the BBUs process the workloads because the actual computation cycles needed for a workload depend on instantaneous conditions. Although a wireless scheduler or the controller 416 may know channel measurement reports, pick transmission modes, and decide which resource blocks may be assigned to which users, it may not know the instantaneous channel conditions and how many decoding iterations each block requires. In one example, processing cycles may be measured directly at each BBU when processing workloads. In another example, processing cycles may be inferred by timestamping the workloads as they enter and exit the BBUs. The measured cycles (i.e., $\rho_{i,k}$) may be committed to the database 412 along with information about the RRHs 440, the frame and subframe identifiers. A modeler 414 may be configured to continuously read $\rho_{i,k}$ values and generate useful information that may be directly consumed by the controller 416 to make workload distribution decisions.

Machine learning (ML) techniques provide new opportunities in analysis and classification of workloads, and may provide an edge on optimal resource usage in RAN clouds that are to be relatively more resource constrained. When workloads do not adhere to a particular mathematical model, finding and weighing the relevant features of the workloads via ML in real-time is of paramount importance.

Figure 5:
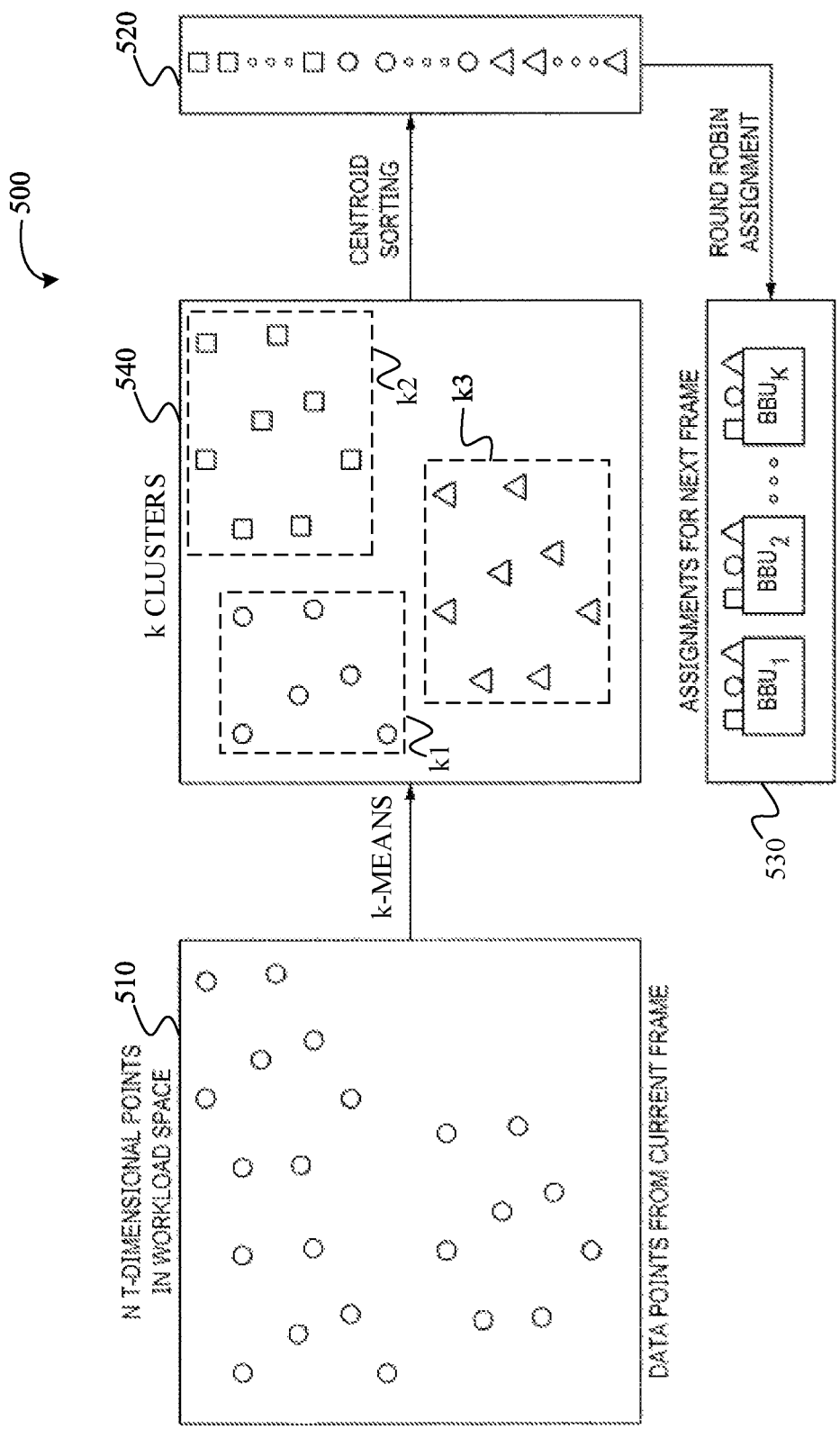
FIG. 5 illustrates a diagram of an embodiment workload distribution method.

FIG. 5 illustrates a diagram of an embodiment method 500 for assigning/distributing workloads to BBUs in the network as illustrated in FIG. 4. The embodiment method may be applied for workload assignment/distribution onto any slice segments. In this embodiment, variation of processing time of each RRH workload during a frame including T subframes may be represented as a point in T-dimensional vector (or workload) space 510. The T-dimensional vector space herein may refer to a space formed in terms of processing times required by historical workloads received at a mux/demux unit in a consecutive batch of T time intervals. That is, each dimension of the T-dimensional vector space represents processing time (or cycle) used during one of the T time intervals. A ML technique may be used to form the T-dimensional vector space using collected data about the historical workloads and processing times (or processing cycles, computational cycles). Since there are N RRHs, N points are generated in this T-dimensional space 510 in every timeframe and these points are mapped onto one of the K BBUs according to an assignment decision. FIG. 5 illustrates N small circles in the T-dimensional vector space 510 representing N points of workloads from a current frame. When two points in this T-dimensional space 510 are close to each other, e.g., when the distance between the two points is less than a threshold, their workload fluctuations may be determined to be correlated, and aggregating them together onto the same BBU may increase the variance of the total workload at the BBU on a subframe basis. In some embodiments, to avoid possible workload peaks, workload vectors that are sufficiently uncorrelated may be assigned to the same BBU. For example, a large workload at one RRH unit and a small workload at another RRH unit (less correlated to each other) may be assigned to the same BBU, in a subframe, so that the sum of RRH workloads at the BBU in the subframe does not become too high.

In general, two workloads may be determined to be correlated to each other when the two workloads being assigned to a same BBU may cause overload of the BBU. For example, two workloads may be determined to be correlated to each other when the points representing the two workloads in the T-dimensional vector space 510, respectively, are within a pre-determined distance, or a pre-determined area. The embodiment methods determine correlation of workloads, and avoid assigning/distributing correlated workloads to the same BBU. In some embodiments, workloads (or points in the T-dimensional space) may have labels to indicate whether and how they are correlated. In this case, the points that have the same label may not be assigned to the same BBU. In some embodiments, points may also be labeled with load values to indicate whether they require greater or smaller number of computing cycles. In this case, points having labels with the higher total load values may be load balanced across BBUs before labels with the lower values.

In some embodiments, correlation among the N points (i.e., workloads) in the T-dimensional vector space 510 may be determined based on distance between the N points in the T-dimensional vector space 510. For example, when distance between some points is within a threshold, these points are determined to have correlation, and may not be assigned to the same BBU. In some embodiments, the N points may be partitioned into a plurality of clusters based on distances between the points. Each cluster includes points that are correlated to one another, and points in different clusters are less correlated than points in the same cluster. In some embodiments, k-means clustering, a widely used tool in the context of unsupervised learning for clustering unlabeled data points, may be used for assigning the workloads. According to an embodiment, the N points in the T-dimensional vector space 510 may be partitioned into k clusters 540, where k is typically picked larger than or equal to K, i.e., the number of BBUs. Each cluster includes points that are correlated to one another. In one example of a k-means algorithm, the algorithm may start with k centroid points and map each workload point to the closest centroid. All workload points that are mapped to the same centroid form a cluster. The algorithm may then compute a new centroid based on the workload points assigned to the same cluster in the previous iteration, and all the workload points may be reassigned/remapped based on the new centroid. The algorithm may repeat this centroid computation and assignment process until the new centroid points become the same as the previous centroid points (i.e., clusters converge). FIG. 5 illustrates three (3) clusters as an example, i.e., cluster k1 represented by small circles (circle cluster), cluster k2 represented by small squares (square cluster) and cluster k3 represented by small triangles (triangle cluster). In some embodiments, the number of the clusters may be equal to the number of the BBUs. For example, if there are K BBUs, then the N points may be partitioned into K clusters. Workloads in the same cluster are correlated with one another. The workloads may then be assigned to the BBUs such that workloads in the same cluster are assigned to different BBUs. That is, correlated workloads may not be assigned to the same BBU. In one example, the clusters may be sorted in a descending order with respect to a total weight (e.g., $L_1$-norm) of their centroids, as shown in block 520 as an example. Starting from the cluster with the highest order, e.g., the cluster represented by squares, the N points may be mapped in a round-robin fashion to the K BBUs. As shown in block 530, each BBU is assigned with 3 workloads picked in the square cluster, the circle cluster and the triangle cluster, respectively. Those of ordinary skill in the art would recognize many other techniques may be used to assign the workloads in the clusters to the BBUs so that correlated workloads are not assigned to the same BBU. The mapping function constructed based on the measurements in the current timeframe may be used for RRH to BBU assignment in the next timeframe.

In some embodiments, a multiplexer/demultiplexer, e.g., the mux/demux units 302, 306, 308 in FIG. 3, or the mux/demux units 418, 420 in FIG. 4, receives traffic data for a processing time interval T+1. The multiplexer/demultiplexer may include multiple input ports and multiple output ports. The output ports may be associated with a set of slice segments during the time interval T+1. The input ports may also be associated with slice segments from which the traffic data is received. The multiplexer/demultiplexer may demultiplex (or divide) the received traffic data into multiple data streams, and map each data stream to an output port that is associated with a slice segment. How the data streams are divided and mapped to the output ports may be determined by a controller, such as the controller 416 in FIG. 4. In some embodiments, processing times/cycles of workloads output by the multiplexer/demultiplexer in preceding consecutive T time intervals may be collected and stored in a database. For example, referring back to FIG. 4, the mux/demux unit 418 may report the time that a data stream with a corresponding workload leaves the mux/demux unit 418, and the mux/demux unit 420 may report a time that the data stream arrives at the mux/demux unit 420. In this way, a number of processing cycles (or processing time) used for processing the workload corresponding to the data stream by a slice segment between the mux/demux units 418, 420 may be obtained. A modeler 414 may obtain the historical workload related data (i.e., workload processing times in the preceding T time intervals), and perform analysis. For example, the modeler 414 may perform workload modeling using machine learning algorithms executed by the modeler. In one example, the modeler 414 may form a T-dimensional vector space using the historical workload data, and partition workload points in the T-dimensional vector space into clusters, e.g., using a clustering technique. In another example, the modeler 414 may rank the historical workloads based on their processing times. In yet another example, the modeler 414 may label the historical workloads for correlation. Information about the clustering, ranking or labeling may also be stored in a database. The controller 416 may obtain the clustering or ranking information from the modeler 414, and then programs the mux/demux unit 418 on how to divide traffic data and map data streams to slice segments.

Figure 6:
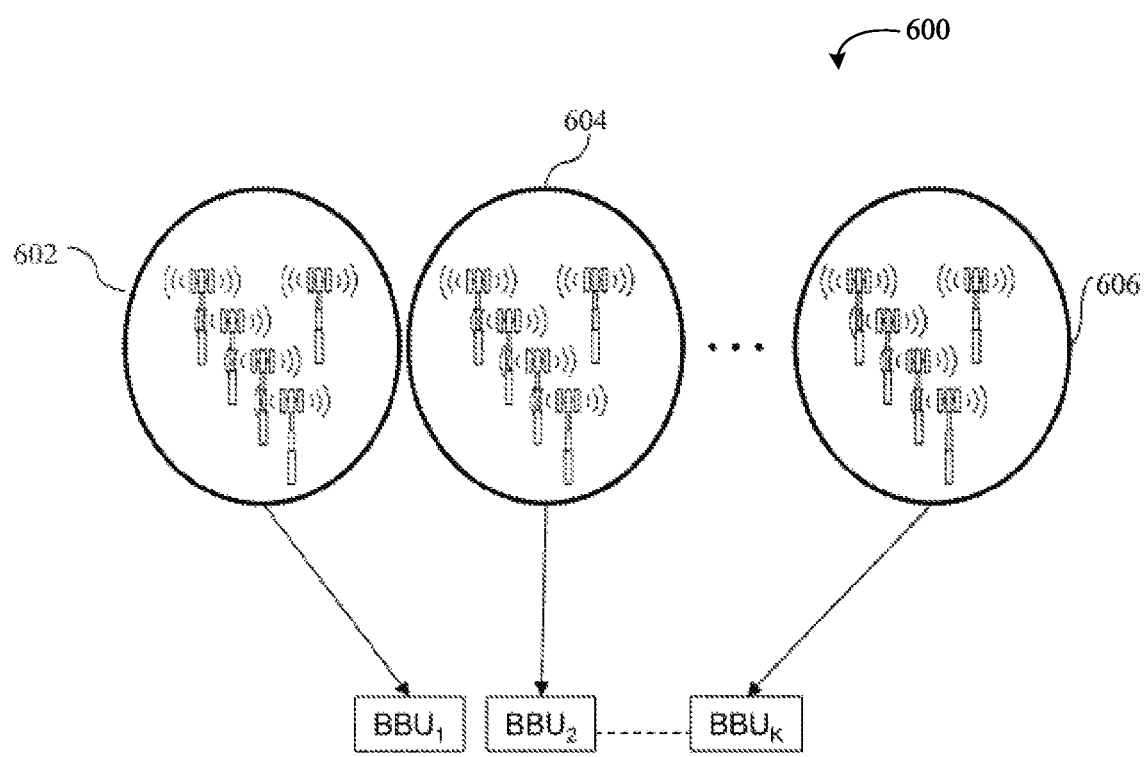
FIG. 6 illustrates a diagram of another embodiment workload distribution method.

The above embodiments distribute workloads using ML techniques that require data collection and modeling stages, which add onto the system complexity. In some embodiments, blind workload aggregation solutions may be employed that do not warrant the additional complexity and associated costs. FIG. 6 illustrates a diagram of an embodiment method 600 for blind workload aggregation (or blind clustering) of RRH workloads to BBUs. In this example, adjacent cells (e.g., RRHs) may be clustered together, forming workload clusters 602, 604, 606. Aggregate workloads of the same cluster may be processed in the same BBU. For instance, the workloads of the clusters 602 are processed in the $BBU_1$, the workloads of the clusters 604 are processed in the $BBU_2$, and the workloads of the clusters 606 are processed in the $BBU_K$. When workloads generated by neighboring RRHs are independent and identically distributed (i.i.d.) in each subframe, such local aggregation may generate smoothed, less variable workloads in time. In dense deployments with flash crowd scenarios or in cooperative multipoint transmitting/receiving (TX/RX) deployments, positive correlations between neighboring RRHs may naturally occur. To diffuse locally correlated workloads, in one embodiment, pseudo-random interleaving (i.e., random balanced clustering) of workloads across RRHs may be first applied before mapping onto BBUs. As RRH to BBU ratio tends to be high, randomization may cause significant collisions of heavy workloads coming from distinct RRHs on the same BBU.

Figure 7:
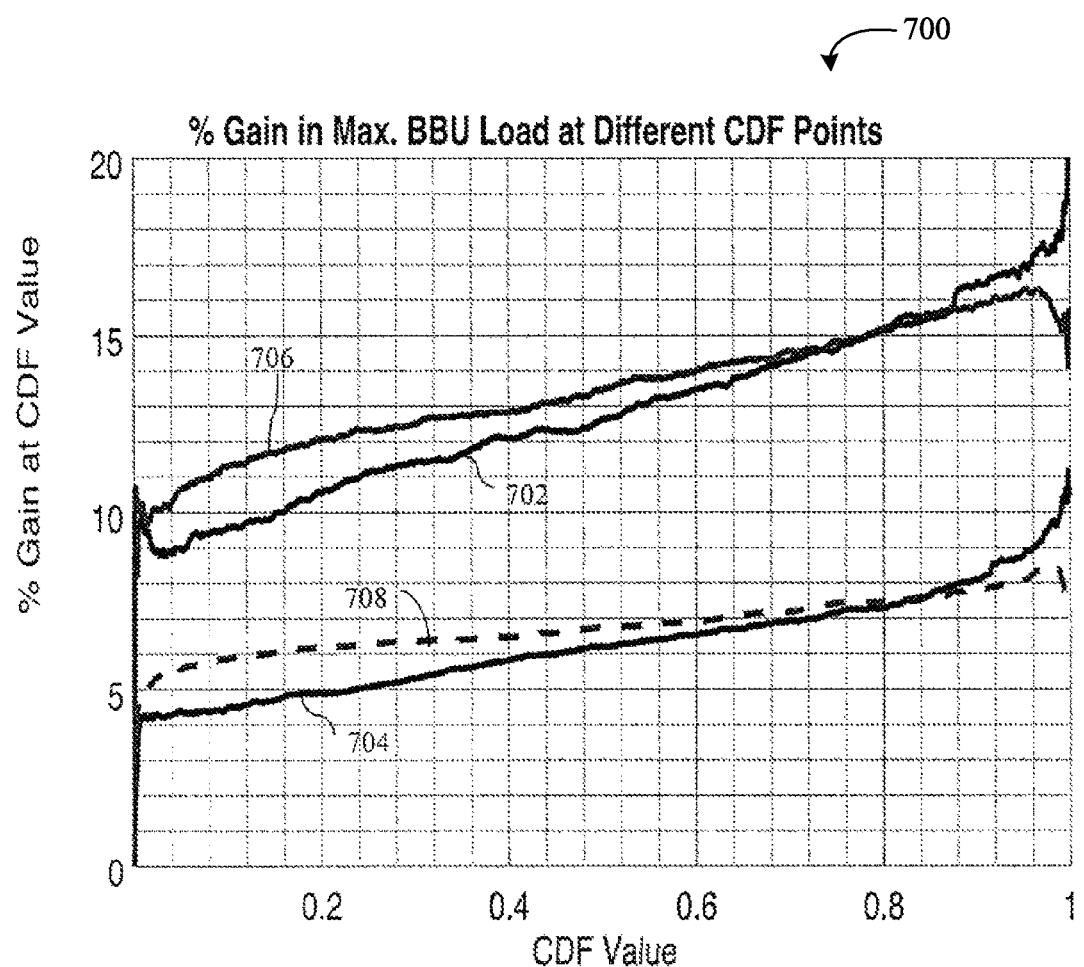
FIG. 7 is a graph illustrating maximum load gains varying with cumulative distribution functions (CDF).

FIG. 7 is a graph illustrating BBU maximum load gains obtained using the embodiment workload distribution method illustrated in FIG. 5 against blind workload aggregation as illustrated in FIG. 6. In this example, independent and identically distributed workloads from each RRH are generated using a random walk process including the following steps: (1) Pick a random load from a first distribution $F_1$. When $F_1$ can generate negative values, truncate the values to zero. (2) Pick a random load duration time from a second distribution $F_2$ with a mean value parameter, i.e., load coherence time (LCT), measured in units of timeframe duration. (3) Repeat steps 1 and 2. $F_1$ may be selected from various distributions including uniform, Gaussian, binomial, Weibull, etc., with different first and second moment characteristics. $F_2$ may also be selected from various distributions including exponential and Pareto with various parameter choices. Gains in terms of maximum load observed by any BBU in a given subframe at different cumulative distribution function (CDF) points (i.e., CDF values) are evaluated under four different simulation scenarios over 100,000 frames. The four different simulation scenarios include different combinations of $F_1$ and $F_2$ distributions. Curves 702, 704 show two simulation scenarios where $F_1$ is a Gaussian distribution with different parameters and $F_2$ is an exponential distribution. The curve 702 shows a Gaussian distribution with mean to and standard deviation (std) 8, and an exponential distribution with mean 30. The curve 704 shows a Gaussian distribution with mean to and standard deviation 3, and an exponential distribution with mean 30. Curves 706, 708 show two simulation scenarios where $F_1$ is a uniform distribution and $F_2$ is an exponential distribution with different parameters. The curve 706 shows a uniform distribution with mean to and an exponential distribution with mean 30. The curve 708 shows a uniform distribution with mean 5, and an exponential distribution with mean 3. FIG. 7 shows a representative subset of these evaluations. The ML approach is benchmarked against the blind clustering or random balanced clustering, as in this example, the blind clustering and random balanced clustering have generally the same performance. The x-axis when multiplied by 100 corresponds to different percentile points (e.g., 0.99 corresponds to $99^{th}$ percentile). It can be seen that as the variance of load amplitudes increases or LCT gets longer, the gains become more significant. At $80^{th}$ percentile and above, ML approach provides more than 15% savings in maximum BBU load for uniformly distributed workloads with LCT=30 and Gaussian distributed workloads with standard deviation 8. When LCT is too small, clustering based on the previous frames may capture workload correlations less and modeling may not provide significant gains. One remedy is to update the model every subframe rather than every frame. LCT=30 corresponds to 300 milliseconds in the case of a LTE frame length of to milliseconds, which is not a large duration considering that peak loads are generated by elephant flows with longer session lifetime. The blind clustering performs the same as the random balanced clustering approach in these simulations when correlation between the neighboring RRHs is not assumed.

It is noted that because correlation in neighboring RRHs is not imposed, blind clustering already provides substantial statistical multiplexing.

Figure 8:
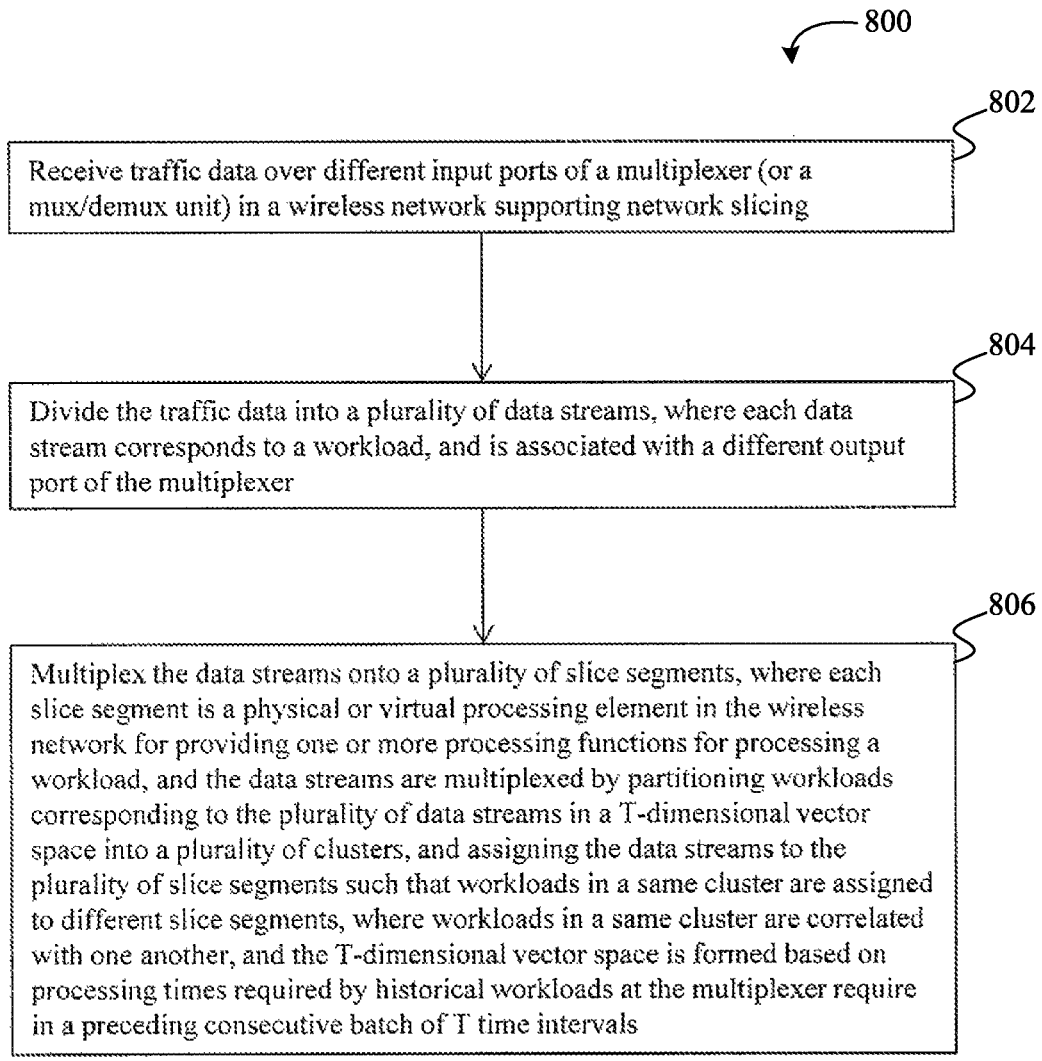
FIG. 8 illustrates a flowchart of an embodiment wireless communications method.

FIG. 8 illustrates a flowchart of an embodiment method 800 for wireless communications. The method 800 may be indicative of operations of a mux/demux unit, e.g., the mux/demux units 302, 304, 306, 308 in FIG. 3, or the mux/demux units 418, 420 in FIG. 4. As shown, at step 802, the method 800 receives traffic data over different input ports of a multiplexer (or a mux/demux unit) in a wireless network supporting network slicing. At step 804, the method 80000 divides the traffic data into a plurality of data streams, where each data stream corresponds to a workload, and is associated with an output port of the multiplexer. At step 806, the method 800 multiplexes the data streams onto a plurality of slice segments, where each slice segment is a physical or virtual processing element in the wireless network, and the data streams are multiplexed by partitioning workloads corresponding to the plurality of data streams in a T-dimensional vector space into a plurality of clusters, and assigning the data streams to the plurality of slice segments such that workloads in a same cluster are assigned to different slice segments, and where workloads in a same cluster are correlated with one another, and the T-dimensional vector space is formed based on processing times required by historical workloads at the multiplexer in a preceding consecutive batch of T time intervals.

Figure 9:
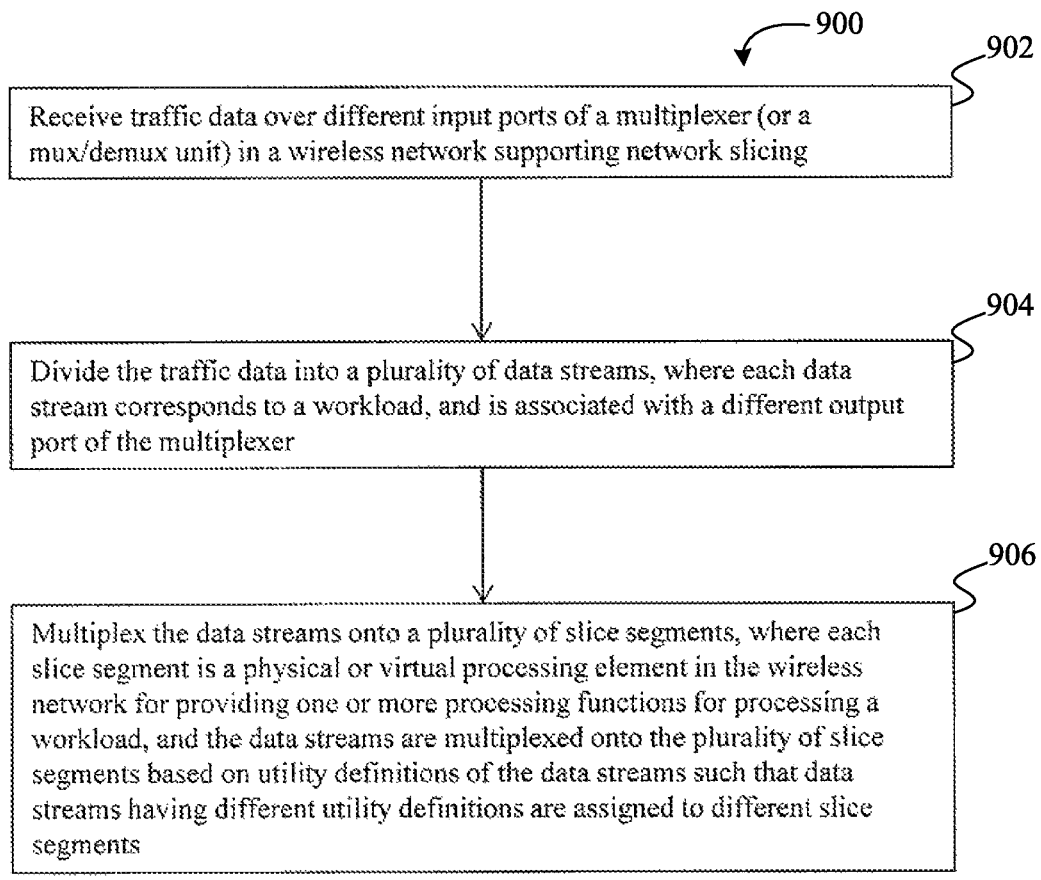
FIG. 9 illustrates a flowchart of another embodiment wireless communications method.

FIG. 9 illustrates a flowchart of another embodiment method 900 for wireless communications. The method 900 may be indicative of operations of a mux/demux unit, e.g., the mux/demux units 302, 304, 306, 308 in FIG. 3, or the mux/demux units 418, 420 in FIG. 4. As shown, at step 902, the method 900 receives traffic data over different input ports of a multiplexer (or a mux/demux unit) in a wireless network supporting network slicing. At step 904, the method 900 divides the traffic data into a plurality of data streams, where each data stream corresponds to a workload, and is associated with an output port of the multiplexer. At step 906, the method goo multiplexes the data streams onto a plurality of slice segments, where each slice segment is a physical or virtual processing element in the wireless network, and the data streams are multiplexed onto the plurality of slice segments based on utility definitions of the data streams such that data streams having different utility definitions are assigned to different slice segments.

Figure 10:
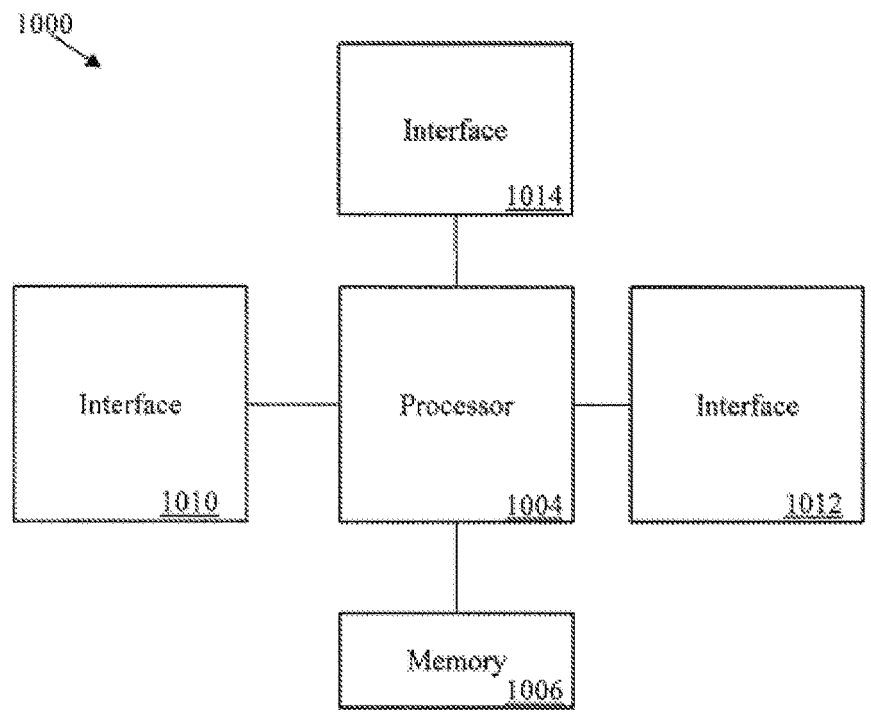
FIG. 10 illustrates a diagram of an embodiment processing system.

FIG. 10 illustrates a block diagram of an embodiment processing system 1000 for performing methods described herein, which may be installed in a host device. As shown, the processing system 1000 includes a processor 1004, a memory 1006, and interfaces 1100-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 10012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
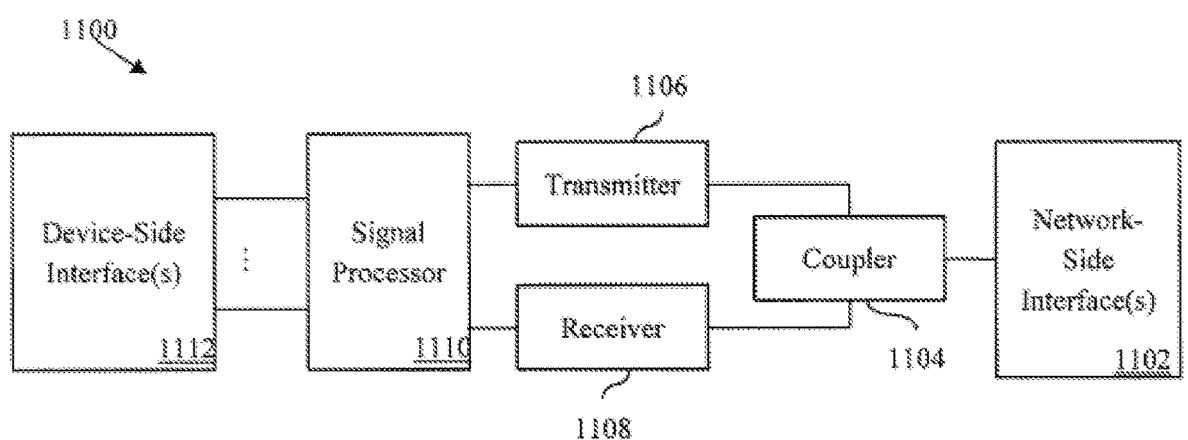
FIG. 11 illustrates a diagram of an embodiment transceiver.

In some embodiments, one or more of the interfaces 1010, 1012, 1014 connects the processing system 1000 to a transceiver adapted to transmit and receive signaling over the telecommunications network. FIG. 11 illustrates a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

An embodiment of present disclosure provides a method, the method comprises: receiving traffic data over different input ports of a multiplexer (or a multiplexing/demultiplexing unit) in a wireless network supporting network slicing; dividing, by the multiplexer, the traffic data into a plurality of data streams, each data stream corresponding to a workload, and being associated with an output port of the multiplexer; and multiplexing, by the multiplexer, the data streams onto a plurality of slice segments, each slice segment being a physical or virtual processing element in the wireless network, wherein multiplexing the data streams comprising: partitioning workloads corresponding to the plurality of data streams in a T-dimensional vector space into a plurality of clusters, workloads in a same cluster being correlated with one another, the T-dimensional vector space being formed based on processing times required by historical workloads at the multiplexer in a preceding consecutive batch of T time intervals; and assigning the data streams to the plurality of slice segments such that workloads in a same cluster are assigned to different slice segments.

In one implementation of the above embodiment, partitioning the workloads corresponding to the plurality of data streams in the T-dimensional vector space comprises partitioning the workloads corresponding to the plurality of data streams using a k-means clustering technique.

In one implementation of the above embodiment or implementation, a slice segment in the plurality of slice segments comprises a cascade of one or more virtual or physical processors.

In one implementation of the above embodiment or implementations, a slice segment in the plurality of slice segments comprises a baseband processing unit.

In one implementation of the above embodiment or implementations, a slice segment in the plurality of slice segments comprises a chain of one or more user plane functions and/or sub-function in a 5G network.

In one implementation of the above embodiment or implementations, the multiplexer comprises a software defined networking (SDN) switch.

In one implementation of the above embodiment or implementations, the multiplexer is located in a radio access network (RAN) cloud.

In one implementation of the above embodiment or implementations, the traffic data is received by the multiplexer from another set of slice segments.

In one implementation of the above embodiment or implementations, each of the plurality of data stream is generated by a different remote radio head (RRH) in the wireless network, and wherein each output port of the multiplexer is associated with a different baseband processing unit (BBU).

In one implementation of the above embodiment or implementations, each of the plurality of data stream includes a traffic flow transmitted by different user equipment (UEs) over uplink channels of the wireless network.

In one implementation of the above embodiment or implementations, each of the plurality of data stream includes a packet flow generated by different baseband processing units (BBUs) in the wireless network.

The present disclosure provides an embodiment of an apparatus, the apparatus comprises a first multiplexing/demultiplexing (mux/demux) unit and a second mux/demux unit, each of the first mux/demux unit and the second mux/demux unit being configured to receive traffic data over different input ports, and divide the traffic data into a plurality of data streams, each data stream corresponding to a workload, and being associated with an output port of the respective mux/demux units; and a plurality of slice segments coupled between the first mux/demux unit and the second mux/demux unit, each slice segment being a physical or virtual processing element in the 5G network, and the plurality of slice segments being configured to process workloads corresponding to the data streams and send processed workloads to the second mux/demux unit. The first mux/demux unit is configured to multiplex the data streams onto the plurality of slice segments according to a pre-determined multiplexing requirement.

In an implementation of the above apparatus embodiment, the multiplexing requirement requires load balancing among the plurality of slice segments, and wherein the first mux/demux unit multiplexes the data streams onto the plurality of slice segments by: partitioning workloads corresponding to the plurality of data streams in a T-dimensional vector space into a plurality of clusters during a first time interval, workloads in a same cluster being correlated with one another, the T-dimensional vector space being formed based on processing times that are required by historical workloads received at the first mux/demux unit in a preceding consecutive batch of T time intervals; and assigning the data streams to the plurality of slice segments such that workloads in a same cluster are assigned to different slice segments.

In an implementation of the above apparatus embodiment and implementation, partitioning the workloads corresponding to the plurality of data streams in the T-dimensional vector space comprises partitioning the workloads corresponding to the plurality of data streams using a k-means clustering technique.

In an implementation of the above apparatus embodiment and implementations, the multiplexing requirement requires that the data streams are assigned to the plurality of slice segments based on utility definitions of the data streams, and wherein data streams having different utility definitions are assigned to different slice segments.

In an implementation of the above apparatus embodiment and implementations, a slice segment in the plurality of slice segments comprises a cascade of one or more virtual or physical processors.

In an implementation of the above apparatus embodiment and implementations, wherein a slice segment in the plurality of slice segments comprises a baseband processing unit.

In an implementation of the above apparatus embodiment and implementations, a slice segment in the plurality of slice segments comprises a chain of one or more user plane functions in the 5G network.

In an implementation of the above apparatus embodiment and implementations, wherein the first mux/demux unit or the second mux/demux unit comprises a software defined networking (SDN) switch.

In an implementation of the above apparatus embodiment and implementations, wherein the first mux/demux unit or the second mux/demux unit is located in a radio access network (RAN) cloud.

In an implementation of the above apparatus embodiment and implementations, traffic data received by the first mux/demux unit is from another set of slice segments.

In an implementation of the above apparatus embodiment and implementations, each of the plurality of data stream at the first mux/demux unit is generated by a different remote radio head (RRH) in the 5G network, and wherein each output port of the first mux/demux unit is associated with a different baseband processing unit (BBU).

In an implementation of the above apparatus embodiment and implementations, each of the plurality of data stream includes a traffic flow transmitted by different user equipment (UEs) over uplink channels of the 5G network.

In an implementation of the above apparatus embodiment and implementations, wherein each of the plurality of data stream includes a packet flow generated by different baseband processing units (BBUs) in the 5G network.

The present disclosure provides another embodiment of an apparatus, the apparatus comprises a first multiplexing/demultiplexing (mux/demux) unit and a second mux/demux unit, each of the first mux/demux unit and the second mux/demux unit being configured to receive traffic data over different input ports, and divide the traffic data into a plurality of data streams, each data stream corresponding to a workload, and being associated with an output port of the respective mux/demux units; and a plurality of slice segments coupled between the first mux/demux unit and the second mux/demux unit, each slice segment being a physical or virtual processing element in a wireless network, and the plurality of slice segments being configured to process workloads corresponding to the data streams and send processed workloads to the second mux/demux unit. The first mux/demux unit is configured to multiplex the data streams onto the plurality of slice segments by: partitioning workloads corresponding to the plurality of data streams in a T-dimensional vector space into a plurality of clusters during a first time interval, workloads in a same cluster being correlated with one another, the T-dimensional vector space being formed based on processing times that are required by historical workloads received at the first mux/demux unit in a preceding consecutive batch of T time intervals; and assigning the data streams to the plurality of slice segments such that workloads in a same cluster are assigned to different slice segments.

In an implementation of the above apparatus embodiment, a slice segment in the plurality of slice segments comprises a cascade of one or more virtual or physical processors.

In an implementation of the above apparatus embodiment and implementations, a slice segment in the plurality of slice segments comprises a baseband processing unit.

In an implementation of the above apparatus embodiment and implementations, a slice segment in the plurality of slice segments comprises a chain of one or more user plane functions in a 5G network.

In an implementation of the above apparatus embodiment and implementations, wherein the first mux/demux unit or the second mux/demux unit comprises a software defined networking (SDN) switch.

In an implementation of the above apparatus embodiment and implementations, the first mux/demux unit or the second mux/demux unit is located in a radio access network (RAN) cloud.

In an implementation of the above apparatus embodiment and implementations, traffic data received by the first mux/demux unit is from another set of slice segments.

In an implementation of the above apparatus embodiment and implementations, each of the plurality of data stream at the first mux/demux unit is generated by a different remote radio head (RRH) in a 5G network, and wherein each output port of the first mux/demux unit is associated with a different baseband processing unit (BBU).

In an implementation of the above apparatus embodiment and implementations, each of the plurality of data stream includes a traffic flow transmitted by different user equipment (UEs) over uplink channels of the 5G network.

In an implementation of the above apparatus embodiment and implementations, each of the plurality of data stream includes a packet flow generated by different baseband processing units (BBUs) in a 5G network.

The present disclosure provides an embodiment of an apparatus, the apparatus a first multiplexing/demultiplexing (mux/demux) unit and a second mux/demux unit, each of the first mux/demux unit and the second mux/demux unit being configured to receive traffic data over different input ports, and divide the traffic data into a plurality of data streams, each data stream corresponding to a workload, and being associated with an output port of the respective mux/demux units; and a plurality of slice segments coupled between the first mux/demux unit and the second mux/demux unit, each slice segment being a physical or virtual processing element in the 5G network, and the plurality of slice segments being configured to process workloads corresponding to the data streams and send processed workloads to the second mux/demux unit. The first mux/demux unit is configured to multiplex the data streams onto the plurality of slice segments based on utility definitions of the data streams, such that data streams having different utility definitions are assigned to different slice segments.

In an implementation of the above apparatus embodiment and implementations, a slice segment in the plurality of slice segments comprises a cascade of one or more virtual or physical processors.

In an implementation of the above apparatus embodiment and implementations, a slice segment in the plurality of slice segments comprises a baseband processing unit.

In an implementation of the above apparatus embodiment and implementations, a slice segment in the plurality of slice segments comprises a chain of one or more user plane functions in the 5G network.

In an implementation of the above apparatus embodiment and implementations, the first mux/demux unit or the second mux/demux unit comprises a software defined networking (SDN) switch.

In an implementation of the above apparatus embodiment and implementations, the first mux/demux unit or the second mux/demux unit is located in a radio access network (RAN) cloud.

In an implementation of the above apparatus embodiment and implementations, traffic data received by the first mux/demux unit is from another set of slice segments.

In an implementation of the above apparatus embodiment and implementations, each of the plurality of data stream at the first mux/demux unit is generated by a different remote radio head (RRH) in the 5G network, and wherein each output port of the first mux/demux unit is associated with a different baseband processing unit (BBU).

In an implementation of the above apparatus embodiment and implementations, each of the plurality of data stream includes a traffic flow transmitted by different user equipment (UEs) over uplink channels of the 5G network.

In an implementation of the above apparatus embodiment and implementations, each of the plurality of data stream includes a packet flow generated by different baseband processing units (BBUs) in the 5G network.

The present disclosure provides an embodiment of a method, the method comprises: receiving traffic data over different input ports of a multiplexer (or a multiplexing/demultiplexing unit) in a wireless network supporting network slicing; dividing, by the multiplexer, the traffic data into a plurality of data streams, each data stream corresponding to a workload, and being associated with an output port of the multiplexer; and multiplexing, by the multiplexer, the data streams onto a plurality of slice segments, each slice segment being a physical or virtual processing element in the wireless network, wherein multiplexing the data streams comprising multiplexing the data streams onto the plurality of slice segments based on utility definitions of the data streams such that data streams having different utility definitions are assigned to different slice segments.

The present disclosure provides an embodiment of a method, the method comprises: receiving traffic data over at least two input ports of a multiplexer in a wireless network supporting network slicing; dividing the traffic data into a plurality of data streams that correspond to a plurality of workloads; and multiplexing the data streams onto a plurality of slice segments, wherein each slice segment comprises at least one processing element in the wireless network.

In an implementation of the above apparatus embodiment the at least one processing element is a virtual processing element.

In an implementation of the above apparatus embodiment and implementations, the at least one processing element is a physical processing element.

In an implementation of the above apparatus embodiment and implementations, wherein the step of multiplexing further comprises: correlating workloads that are in the same cluster; partitioning the plurality of workloads corresponding to the plurality of data streams in a vector space into a plurality of clusters; correlating workloads based upon the presence of at least two workloads in one of the plurality of clusters; and assigning the data streams to the plurality of slice segments such that workloads in a same cluster are assigned to different slice segments.

In an implementation of the above apparatus embodiment and implementations, the vector space is formed based on processing times required by historical workloads at the multiplexer in a preceding consecutive batch of time intervals.

The present disclosure provides an embodiment of a method, the method comprises: receiving traffic data over different input ports of a multiplexer (or a multiplexing/demultiplexing unit) in a wireless network supporting network slicing; dividing, by the multiplexer, the traffic data into a plurality of data streams, each data stream corresponding to a workload, and being associated with an output port of the multiplexer; and multiplexing, by the multiplexer, the data streams onto a plurality of slice segments, each slice segment being a physical or virtual processing element in the wireless network.

In an implementation of the above apparatus embodiment and implementations, multiplexing the data streams comprises: partitioning workloads corresponding to the plurality of data streams in a T-dimensional vector space into a plurality of clusters, workloads in a same cluster being correlated with one another, the T-dimensional vector space being formed based on processing times required by historical workloads at the multiplexer in a preceding consecutive batch of T time intervals; and assigning the data streams to the plurality of slice segments such that workloads in a same cluster are assigned to different slice segments.

In an implementation of the above apparatus embodiment and implementations, partitioning the workloads corresponding to the plurality of data streams in the T-dimensional vector space comprises partitioning the workloads corresponding to the plurality of data streams using a k-means clustering technique.

In an implementation of the above apparatus embodiment and implementations, a slice segment in the plurality of slice segments comprises a cascade of one or more virtual or physical processors.

In an implementation of the above apparatus embodiment and implementations, a slice segment in the plurality of slice segments comprises a baseband processing unit.

In an implementation of the above apparatus embodiment and implementations, a slice segment in the plurality of slice segments comprises a chain of one or more user plane functions and/or sub-function in a 5G network.

In an implementation of the above apparatus embodiment and implementations, the multiplexer comprises a software defined networking (SDN) switch.

In an implementation of the above apparatus embodiment and implementations, the multiplexer is located in a radio access network (RAN) cloud.

In an implementation of the above apparatus embodiment and implementations, the traffic data is received by the multiplexer from another set of slice segments.

In an implementation of the above apparatus embodiment and implementations, each of the plurality of data stream is generated by a different remote radio head (RRH) in the wireless network, and wherein each output port of the multiplexer is associated with a different baseband processing unit (BBU).

In an implementation of the above apparatus embodiment and implementations, each of the plurality of data stream includes a traffic flow transmitted by different user equipment (UEs) over uplink channels of the wireless network.

In an implementation of the above apparatus embodiment and implementations, each of the plurality of data stream includes a packet flow generated by different baseband processing units (BBUs) in the wireless network.

In an implementation of the above apparatus embodiment and implementations, multiplexing the data streams comprises multiplexing the data streams onto the plurality of slice segments based on utility definitions of the data streams such that data streams having different utility definitions are assigned to different slice segments.

The present disclosure provides an embodiment of an apparatus, the apparatus comprises a non-transitory memory storage comprising instructions; and one or more processors in communication with the memory storage, wherein the one or more processors execute the instructions to perform the method in any of method embodiment or implementation above.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a dividing unit/module, a multiplexing unit/module, an assigning unit/module, a partitioning unit/module, a generating unit/module, a configuring unit/module, a mapping unit/module, and/or an associating unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
   receiving, by a network node, traffic data in a wireless network supporting network slicing;
   dividing, by the network node, the traffic data into a plurality of data streams, each data stream corresponding to a workload; and
   multiplexing, by the network node, the plurality of data streams onto a plurality of slice segments of the wireless network based on workloads corresponding to the plurality of data streams, wherein a subset number of data streams in the plurality of data streams is greater than a subset number of slice segments in the plurality of slice segments, wherein the multiplexing the plurality of data streams comprises:
      partitioning the workloads into a plurality of clusters based on correlations among the workloads, wherein a correlation distance between any two workloads in a same cluster of the plurality of clusters is less than a threshold value, and a correlation distance between any two workloads from two different clusters of the plurality of clusters is greater than the threshold value; and
      assigning the plurality of data streams to the plurality of slice segments such that workloads in the same cluster are assigned to different slice segments.

2. The method of claim 1, wherein a slice segment in the plurality of slice segments comprises a cascade of one or more virtual or physical processors in the wireless network.

3. The method of claim 1, wherein a slice segment in the plurality of slice segments comprises a baseband processing unit in the wireless network.

4. The method of claim 1, wherein a slice segment in the plurality of slice segments comprises a chain of one or more user plane functions in the wireless network.

5. The method of claim 1, wherein the network node comprises a software defined networking (SDN) switch.

6. The method of claim 1, wherein the network node is located in a radio access network (RAN) cloud in the wireless network.

7. The method of claim 1, wherein the traffic data is received by the network node from a set of slice segments different than the plurality of slice segments.

8. The method of claim 1, wherein each of the plurality of data streams is generated by a remote radio head (RRH) in the wireless network, and wherein the network node is associated with a baseband processing unit (BBU).

9. The method of claim 1, wherein the plurality of data streams includes traffic flows transmitted from different user equipment (UEs) over uplink channels of the wireless network.

10. The method of claim 1, wherein the plurality of data streams includes packet flows generated by different baseband processing units (BBUs) in the wireless network.

11. The method of claim 1, wherein the workload is formed from at least one of a network function, an application, or a transportation.

12. The method of claim 1, the multiplexing comprising:
    multiplexing, by the network node, the plurality of data streams onto the plurality of slice segments based on utility definitions of the workloads, wherein two data streams corresponding to different workload utility definitions are multiplexed onto two different slice segments of the plurality of slice segments.

13. An apparatus comprising:
    a non-transitory memory storage comprising instructions; and
    one or more processors in communication with the non-transitory memory storage, the instructions being configured to, upon execution by the one or more processors, cause the apparatus to perform operations, the operations comprising:
       receiving traffic data in a wireless network supporting network slicing;
       dividing the traffic data into a plurality of data streams, each data stream corresponding to a workload; and
       multiplexing the plurality of data streams onto a plurality of slice segments of the wireless network based on workloads corresponding to the plurality of data streams, wherein a subset number of data streams in the plurality of data streams is greater than a subset number of slice segments in the plurality of slice segments, wherein the multiplexing the plurality of data streams comprises:
          partitioning the workloads corresponding to the plurality of data streams into a plurality of clusters based on correlations among the workloads, wherein a correlation distance between any two workloads in a same cluster of the plurality of clusters is less than a threshold value, and a correlation distance between any two workloads from two different clusters of the plurality of clusters is greater than the threshold value; and
          assigning the plurality of data streams to the plurality of slice segments such that workloads in the same cluster are assigned to different slice segments.

14. The apparatus of claim 13, wherein a slice segment in the plurality of slice segments comprises a cascade of one or more virtual or physical processors in the wireless network.

15. The apparatus of claim 13, wherein a slice segment in the plurality of slice segments comprises a baseband processing unit in the wireless network.

16. The apparatus of claim 13, wherein a slice segment in the plurality of slice segments comprises a chain of one or more user plane functions in the wireless network.

17. The apparatus of claim 13, wherein the apparatus comprises a software defined networking (SDN) switch.

18. The apparatus of claim 13, wherein the apparatus is located in a radio access network (RAN) cloud in the wireless network.

19. The apparatus of claim 13, wherein the traffic data is received from a set of slice segments different than the plurality of slice segments.

20. The apparatus of claim 13, wherein each of the plurality of data streams is generated by a remote radio head (RRH) in the wireless network, and wherein the apparatus is associated with a baseband processing unit (BBU).

21. The apparatus of claim 13, wherein the plurality of data streams includes traffic flows transmitted from different user equipment (UEs) over uplink channels of the wireless network.

22. The apparatus of claim 13, wherein the plurality of data streams include packet flows generated by different baseband processing units (BBUs) in the wireless network.

23. The apparatus of claim 13, wherein the workload is formed from at least one of a network function, an application, or a transportation.

* * * * *